(12) United States Patent
Takagi

(10) Patent No.: US 8,730,008 B2
(45) Date of Patent: May 20, 2014

(54) AUTHENTICATION METHOD

(75) Inventor: Junji Takagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 637 days.

(21) Appl. No.: 12/561,595

(22) Filed: Sep. 17, 2009

(65) Prior Publication Data

US 2010/0001831 A1 Jan. 7, 2010

(30) Foreign Application Priority Data

Oct. 2, 2008 (JP) ................................ 2008-257751

(51) Int. Cl.
*G05B 19/00* (2006.01)
*H04B 1/00* (2006.01)
*H04Q 1/00* (2006.01)
*G05B 23/00* (2006.01)
*G06K 9/00* (2006.01)
*G06F 21/00* (2013.01)
*G06F 9/00* (2006.01)
*G06F 11/30* (2006.01)

(52) U.S. Cl.
USPC ......... 340/5.82; 340/5.52; 340/5.8; 340/5.86; 382/124; 382/115; 713/186; 713/2; 713/187

(58) Field of Classification Search
CPC ..... G06K 1/00; G06K 7/0004; G06K 7/0095; G06K 15/00; G06K 2007/00; G06K 2215/00; G06K 2007/10485; G06K 2007/10524; G06K 7/0034; G06K 7/00; G06K 7/08; G06K 2009/00885; G09G 3/00; G09G 2320/00; G09G 2380/00; H04L 7/00; H04L 27/00; H04M 11/00; H04M 3/22; H04M 2250/14; H04M 2250/64; G06F 1/00; G06F 9/00; G06F 2009/00; G06F 7/02; G06F 13/10; G06F 21/32; G06F 15/00; G06F 21/445; G06F 21/50; G06F 2015/00; G06F 21/31; G06F 21/44; G06F 21/606

USPC ........... 340/5.52, 5.53, 5.82, 5.83, 5.74, 5.31, 340/5.8; 382/115–127, 383; 283/68, 69
See application file for complete search history.

(56) References Cited

U.S. PATENT DOCUMENTS 7,669,047 B2 * 2/2010 Chou et al. ........................ 713/2
7,809,168 B2 * 10/2010 Abiko et al. ................... 382/115
(Continued)

FOREIGN PATENT DOCUMENTS

JP 2005-352712 12/2005
JP 2007-330503 6/2006
(Continued)

OTHER PUBLICATIONS

Japanese Notification of Reason for Refusal mailed Dec. 18, 2012, issued in corresponding Japanese Patent Application No. 2008-257751.

*Primary Examiner* — Jennifer Mehmood
*Assistant Examiner* — Mirza Alam
(74) *Attorney, Agent, or Firm* — Staas & Halsey LLP

(57) ABSTRACT

A method of controlling an apparatus including a display and a sensor for obtaining biometric data of a user, the sensor being movable to take a plurality of angular positions with respect to the apparatus, includes storing a plurality of sets of reference information in association with the positions of the sensor, respectively, determining which one of the angular positions which the sensor is currently taking, displaying on the display a direction as to which one of bodily parts is to be used in accordance with the current angular position of the sensor to urge a user to input biometric data of the one of the bodily parts by the sensor, and carrying out authentication of the user by comparing the inputted biometric data with one of the sets of reference information corresponding to the current angular position of the sensor.

8 Claims, 22 Drawing Sheets

(56) References Cited

U.S. PATENT DOCUMENTS

| | | | |
|---|---|---|---|
| 7,937,590 B2* | 5/2011 | Wuidart | 713/186 |
| 7,965,873 B2* | 6/2011 | Goto | 382/115 |
| 8,296,574 B2* | 10/2012 | Kosaka | 713/186 |
| 8,396,259 B2* | 3/2013 | Muquit et al. | 382/115 |
| 2002/0001400 A1* | 1/2002 | Yamazaki et al. | 382/115 |
| 2004/0096086 A1* | 5/2004 | Miyasaka et al. | 382/124 |
| 2005/0063567 A1* | 3/2005 | Saitoh et al. | 382/115 |
| 2006/0239517 A1* | 10/2006 | Creasey et al. | 382/124 |
| 2007/0085655 A1* | 4/2007 | Wildman et al. | 340/5.53 |
| 2007/0177767 A1 | 8/2007 | Miura et al. | |
| 2008/0001703 A1* | 1/2008 | Goto | 340/5.8 |
| 2008/0211627 A1* | 9/2008 | Shinzaki | 340/5.82 |
| 2010/0085151 A1* | 4/2010 | Hama et al. | 340/5.82 |

FOREIGN PATENT DOCUMENTS

| | | |
|---|---|---|
| JP | 2007-206991 | 8/2007 |
| JP | 2007-330503 | 12/2007 |

* cited by examiner

FIG. 3A

| OPERATING STATE NUMBER | TURN ANGLE | SCREEN ORIENTATION |
|---|---|---|
| 001 | 0 | HORIZONTAL |
| 002 | 180 | VERTICAL |
| 003 | 180 | HORIZONTAL |

| OPERATING STATE NUMBER | TURN ANGLE | SCREEN ORIENTATION |
|---|---|---|
| 001 | 0 | HORIZONTAL |
| 002 | 180 | VERTICAL |
| 003 | 180 | HORIZONTAL |
| 004 | 90 | HORIZONTAL |

| PATTERN NUMBER | KIND OF FINGER | PRIORITY LEVEL |
|---|---|---|
| 1 | FINGERPRINT OF THUMB OF RIGHT HAND | 1 |
| | FINGERPRINT OF SECOND FINGER OF RIGHT HAND | 2 |
| | FINGERPRINT OF MIDDLE FINGER OF RIGHT HAND | 3 |
| | FINGERPRINT OF FOURTH FINGER OF RIGHT HAND | 4 |
| | FINGERPRINT OF LITTLE FINGER OF RIGHT HAND | 5 |
| | FINGERPRINT OF THUMB OF LEFT HAND | 6 |
| | FINGERPRINT OF SECOND FINGER OF LEFT HAND | 7 |
| | FINGERPRINT OF MIDDLE FINGER OF LEFT HAND | 8 |
| | FINGERPRINT OF FOURTH FINGER OF LEFT HAND | 9 |
| | FINGERPRINT OF LITTLE FINGER OF LEFT HAND | 10 |

| PATTERN NUMBER | KIND OF FINGER | PRIORITY LEVEL |
|---|---|---|
| 2 | FINGERPRINT OF THUMB OF RIGHT HAND | 4 |
| | FINGERPRINT OF SECOND FINGER OF RIGHT HAND | 1 |
| | FINGERPRINT OF MIDDLE FINGER OF RIGHT HAND | 2 |
| | FINGERPRINT OF FOURTH FINGER OF RIGHT HAND | 3 |
| | FINGERPRINT OF LITTLE FINGER OF RIGHT HAND | 5 |
| | FINGERPRINT OF THUMB OF LEFT HAND | 4 |
| | FINGERPRINT OF SECOND FINGER OF LEFT HAND | 1 |
| | FINGERPRINT OF MIDDLE FINGER OF LEFT HAND | 2 |
| | FINGERPRINT OF FOURTH FINGER OF LEFT HAND | 3 |
| | FINGERPRINT OF LITTLE FINGER OF LEFT HAND | 5 |

| OPERATING STATE NUMBER | RECOMMENDED REGISTRATION PATTERN |
|---|---|
| 001 | 1 |
| 002 | 2 |
| 003 | 2 |

| OPERATING STATE NUMBER | RECOMMENDED REGISTRATION PATTERN |
|---|---|
| 001 | 1 |
| 002 | 2 |
| 003 | 2 |
| 004 | 1 |

| USER ID | OPERATING STATE NUMBER | KIND OF FINGER | REGISTRATION QUALITY | FINGERPRINT DATA | UPDATE TIME AND DATE |
|---|---|---|---|---|---|
| UserA | 001 | SECOND FINGER OF RIGHT HAND | 80 POINTS | a$67¥… | …/10/2008 |
| UserA | 001 | THUMB OF RIGHT HAND | 90 POINTS | C5f¥… | …/10/2008 |
| UserA | 001 | MIDDLE FINGER OF RIGHT HAND | 70 POINTS | Adiz¥… | …/10/2008 |
| UserA | 002 | SECOND FINGER OF RIGHT HAND | 80 POINTS | AB5g¥… | …/10/2008 |
| UserA | 002 | THUMB OF RIGHT HAND | 70 POINTS | sa#n¥… | …/10/2008 |
| UserA | 003 | SECOND FINGER OF RIGHT HAND | 80 POINTS | s#d3¥… | …/10/2008 |
| UserA | 003 | THUMB OF RIGHT HAND | 90 POINTS | Po#1¥… | …/10/2008 |
| UserA | 004 | THUMB OF RIGHT HAND | 70 POINTS | Re#7¥… | …/10/2008 |
| … | | | | | … |

FIG. 7

| TIME AND DATE | USER ID | OPERATING STATE NUMBER | KIND OF FINGER | VERIFICATION SCORE | VERIFICATION RESULT |
|---|---|---|---|---|---|
| .../10/2008 | UserA | 001 | SECOND FINGER OF RIGHT HAND | 80 POINTS | SUCCESS |
| .../10/2008 | UserA | 001 | THUMB OF RIGHT HAND | 90 POINTS | SUCCESS |
| .../10/2008 | UserA | 002 | SECOND FINGER OF RIGHT HAND | 80 POINTS | SUCCESS |
| .../10/2008 | UserA | 003 | THUMB OF RIGHT HAND | 80 POINTS | SUCCESS |
| .../10/2008 | UserB | 001 | MIDDLE FINGER OF RIGHT HAND | 30 POINTS | FAILURE |

FIG. 8

REGISTRATION SCREEN

| SELECTION | RECOMMENDED REGISTRATION PRIORITY LEVEL | KIND OF FINGER |
|---|---|---|
| ● | 1 | THUMB OF RIGHT HAND |
| ○ | 2 | SECOND FINGER OF RIGHT HAND |
| ○ | 3 | MIDDLE FINGER OF RIGHT HAND |
| ○ | 4 | FOURTH FINGER OF RIGHT HAND |
| ○ | 5 | LITTLE FINGER OF RIGHT HAND |
| ○ | 6 | THUMB OF LEFT HAND |
| ○ | 7 | SECOND FINGER OF LEFT HAND |
| ○ | 8 | MIDDLE FINGER OF LEFT HAND |
| ○ | 9 | FOURTH FINGER OF LEFT HAND |
| ○ | 10 | LITTLE FINGER OF LEFT HAND |

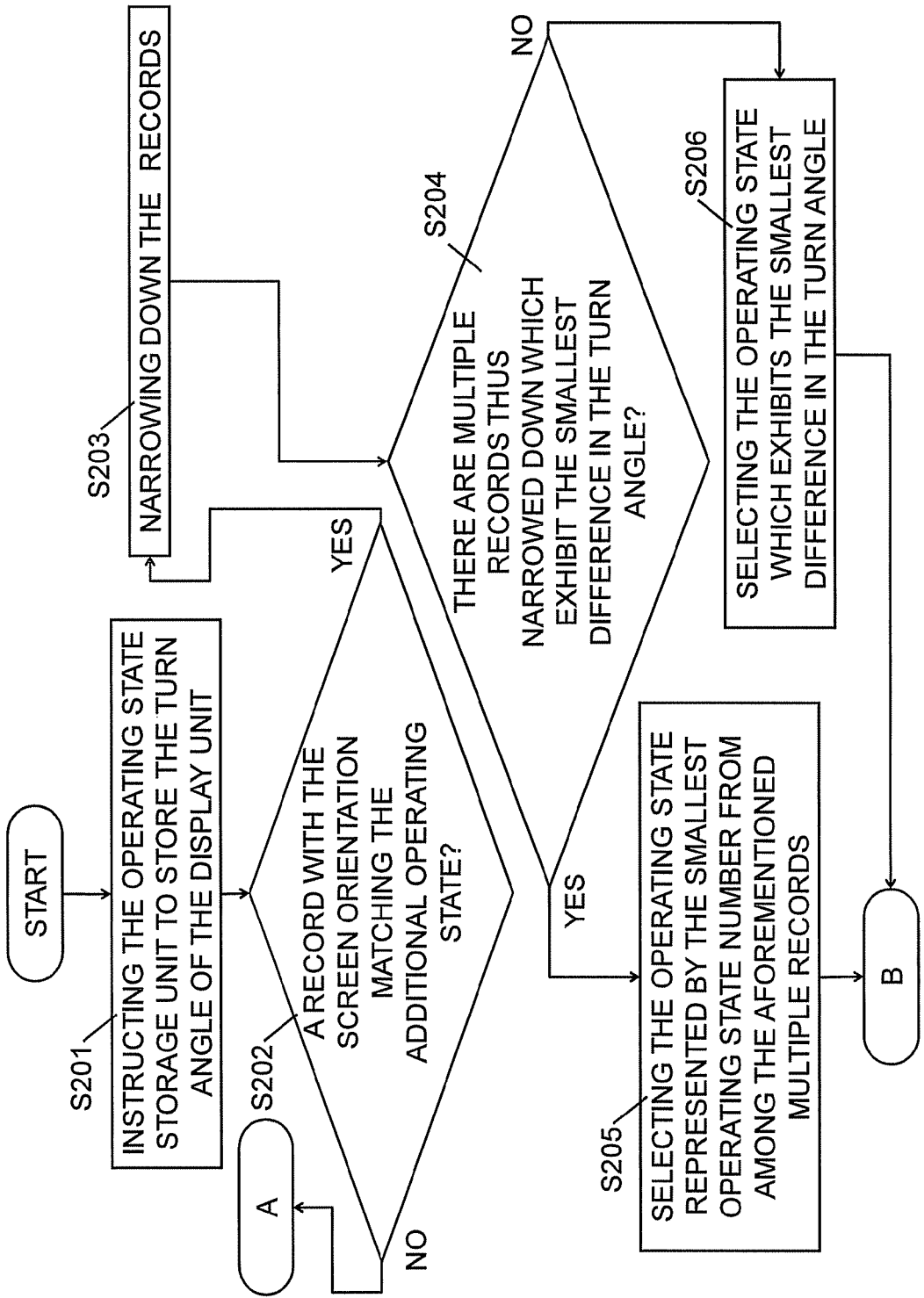

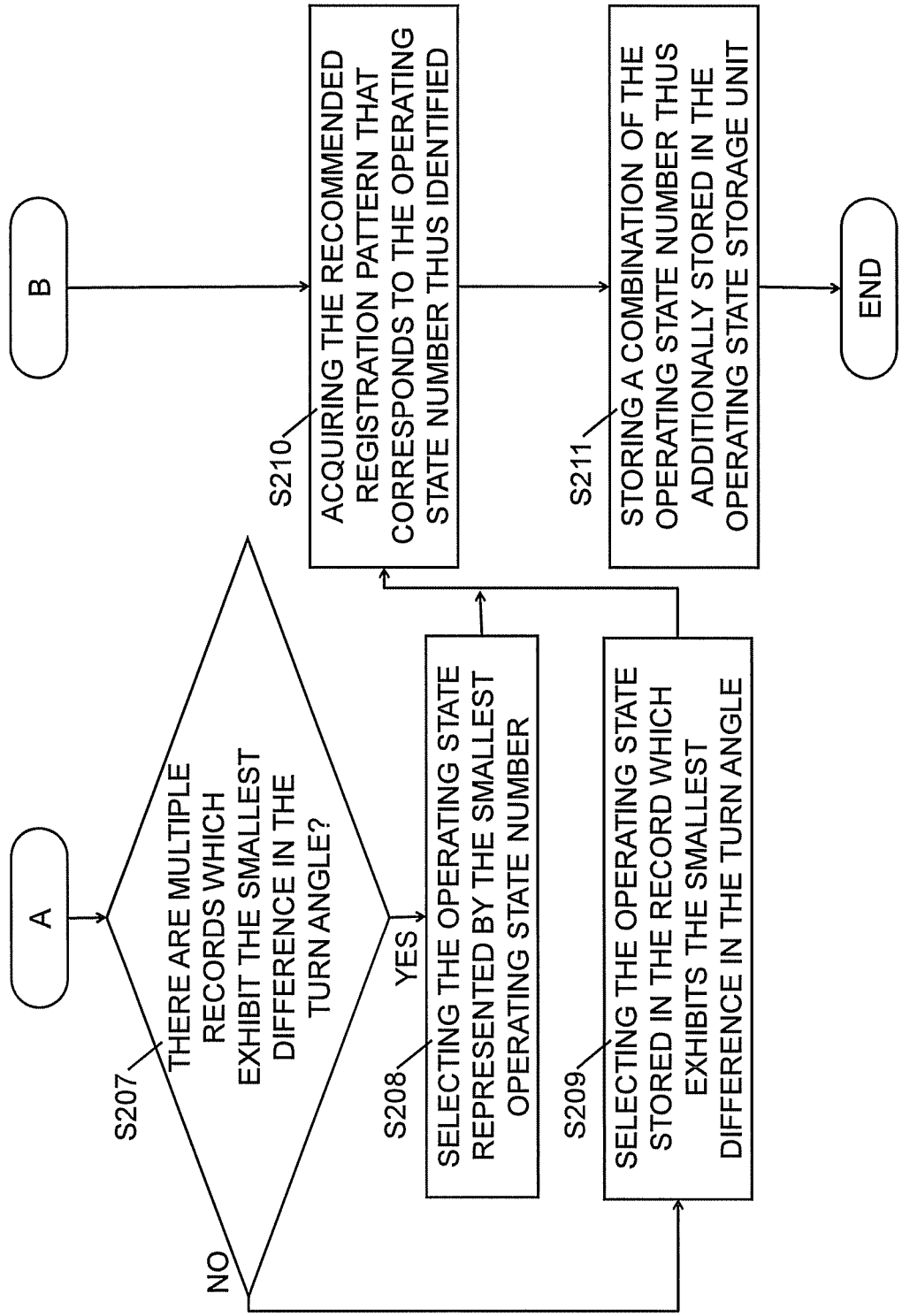

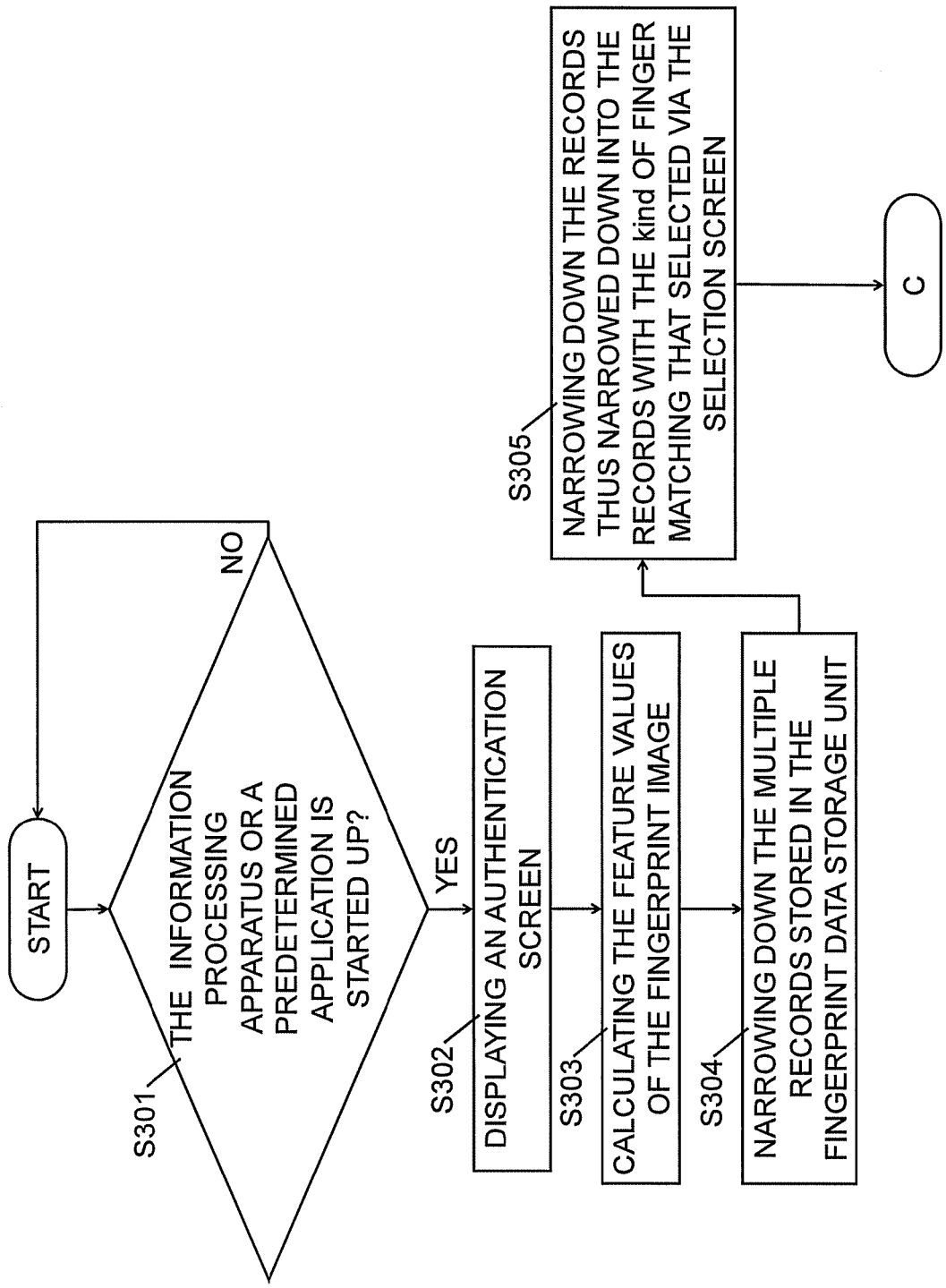

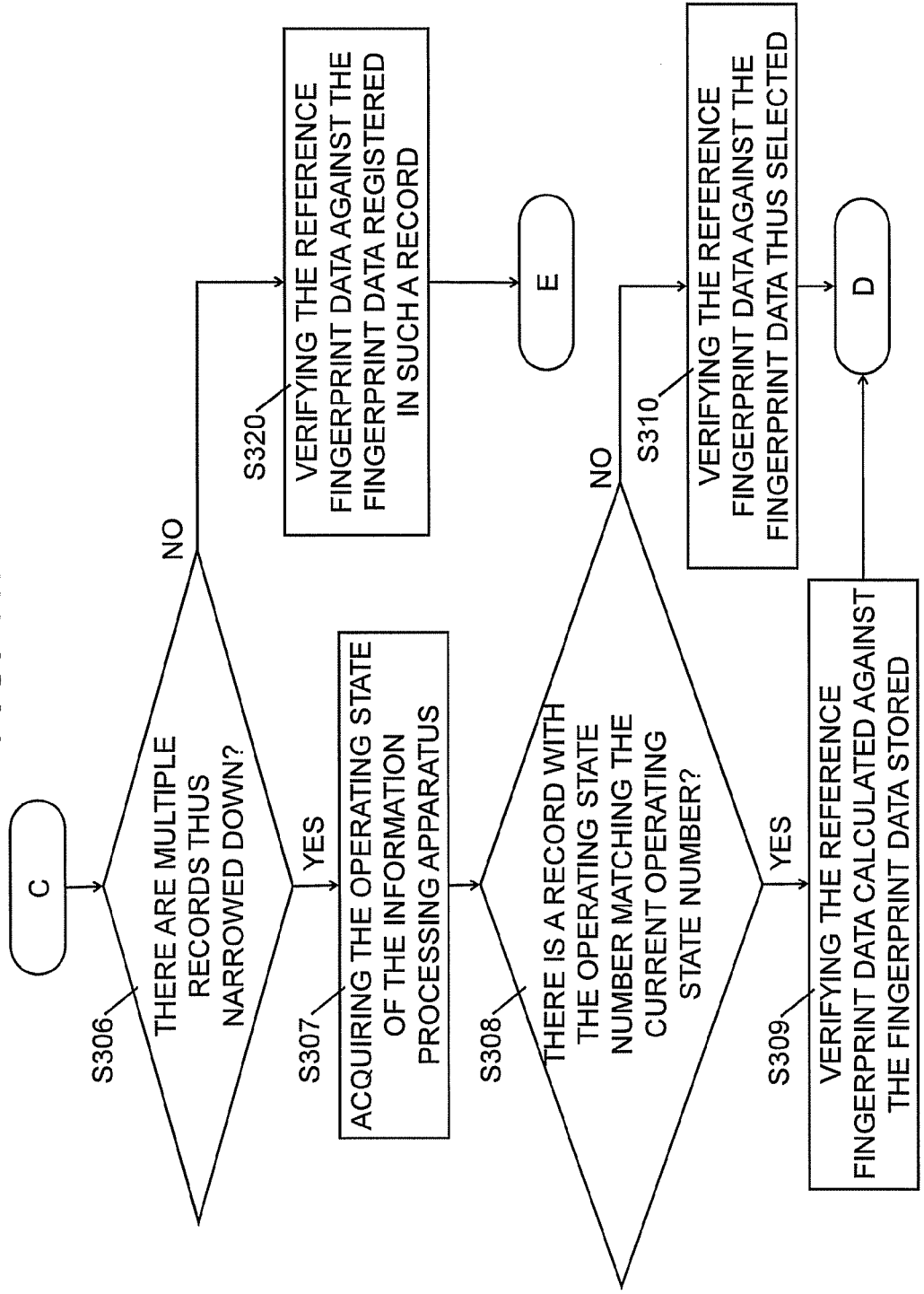

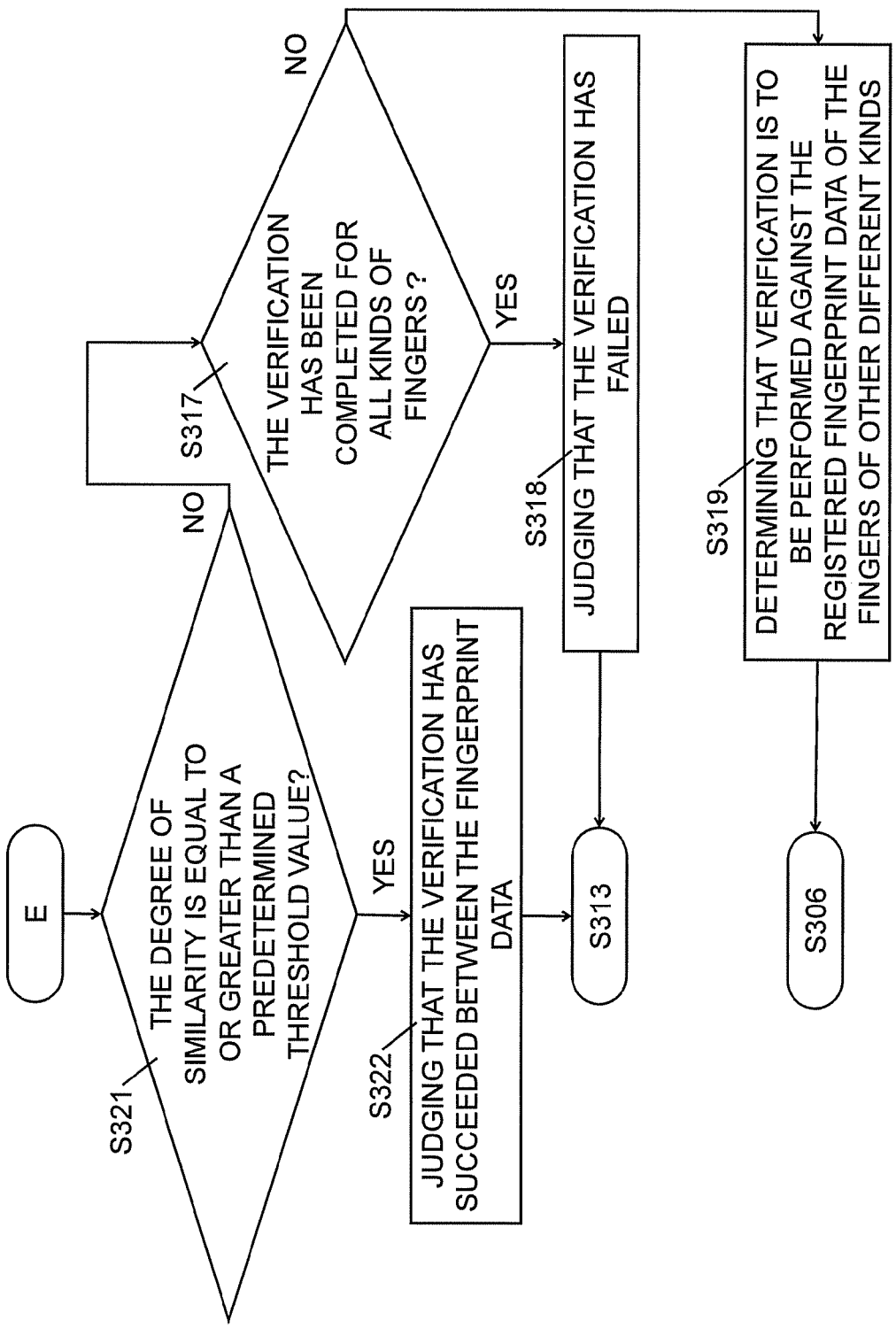

| PATTERN NUMBER | KIND OF FINGER | PRIORITY LEVEL |
|---|---|---|
| 3 | FINGERPRINT OF THUMB OF RIGHT HAND | 1 |
| | FINGERPRINT OF SECOND FINGER OF RIGHT HAND | 4 |
| | FINGERPRINT OF MIDDLE FINGER OF RIGHT HAND | 2 |
| | FINGERPRINT OF FOURTH FINGER OF RIGHT HAND | 3 |
| | FINGERPRINT OF LITTLE FINGER OF RIGHT HAND | 5 |
| | FINGERPRINT OF THUMB OF LEFT HAND | 4 |
| | FINGERPRINT OF SECOND FINGER OF LEFT HAND | 1 |
| | FINGERPRINT OF MIDDLE FINGER OF LEFT HAND | 2 |
| | FINGERPRINT OF FOURTH FINGER OF LEFT HAND | 3 |
| | FINGERPRINT OF LITTLE FINGER OF LEFT HAND | 5 |

| OPERATING STATE NUMBER | RECOMMENDED REGISTRATION PATTERN |
|---|---|
| 001 | 0 |
| 002 | 2 |
| 003 | 3 |

AUTHENTICATION METHOD

CROSS-REFERENCE TO RELATED APPLICATION

This application is based upon and claims the benefit of priority of the prior Japanese Patent Application No. 2008-257751, filed on Oct. 2, 2008, the entire contents of which are incorporated herein by reference.

FIELD

A certain aspect of the embodiments discussed herein is related to an authentication method.

BACKGROUND

Information processing apparatuses such as personal computers or mobile terminals have a fingerprint authentication function. A user who uses such an information processing apparatus registers the user's own fingerprint data beforehand. With such an arrangement, the user presses his/her finger into contact with a fingerprint sensor arranged at a predetermined position before the user operates the information processing apparatus. The information processing apparatus receives a fingerprint image of the finger thus pressed into contact therewith by the user, and verifies the fingerprint image thus received against the fingerprint data registered beforehand.

Such an information processing apparatus is required to perform authentication processing with high precision so as to prevent the occurrence of false authentication. In order to solve such a problem, for example, a vein authentication apparatus is known which registers multiple registration data acquired at different image-acquisition positions, thereby providing high-precision authentication even if the user's finger pressed into contact with the fingerprint sensor shifts position.

Furthermore, for example, a fingerprint verification apparatus is known which extracts the wrinkles and scars on the user's finger from the fingerprint image when the fingerprint data is registered, and the information with respect to the features related to the wrinkles and scars thus extracted is stored as the fingerprint data, in addition to the information with respect to the features of the fingerprint ridges, thereby providing high-precision fingerprint verification, even if the surface of the finger is rough or even if the quality of the fingerprint data is poor due to a great number of scars.

A kind of finger which the user can easily press into contact with the fingerprint sensor differs depending upon the position at which the fingerprint sensor is mounted on the information processing apparatus or the direction in which the user moves his/her finger on the fingerprint sensor. Specifically, in a case in which the fingerprint sensor has been mounted in the vicinity of the keyboard on a notebook personal computer (which will also be referred to as a "laptop personal computer"), the user can easily presses his/her second finger into contact therewith, as compared with his/her thumb. On the other hand, in a case in which the fingerprint sensor has been mounted in the vicinity of the display such that the user can press his/her finger sideways into contact therewith, the user can easily press his/her thumb as compared with his/her second finger.

Furthermore, some desktop personal computers, laptop personal computers, tablet PCs, and so forth have a function of allowing the display to be turned. In such an information processing apparatus, the position of the fingerprint sensor is also moved as the display is moved. That is to say, the kind of finger which the user can easily press into contact with the fingerprint sensor differs depending upon the position at which the fingerprint sensor is arranged and the position of the display.

However, the aforementioned techniques have been made without giving consideration to which kind of finger the user can easily press into contact with the fingerprint sensor. In some cases, this leads to a problem in that high-precision authentication processing cannot be provided depending upon the position at which the fingerprint sensor is arranged. For example, in a case in which the user has selected a kind of finger which cannot easily be pressed into contact with the fingerprint sensor when the user's fingerprint data is registered, in some cases, there is a gap between the user's finger and the fingerprint sensor, or the user's finger shakes. This leads to a problem of poor-quality fingerprint data being registered, leading to a problem in that the information processing apparatus cannot perform authentication processing with high precision.

Japanese Laid-open Patent Publication No. 2007-206991 and Japanese Laid-open Patent Publication No. 2005-352712 have been proposed.

SUMMARY

According to an aspect of an embodiment, a method of controlling an apparatus including a display and a sensor for obtaining biometric data of a user, the sensor being movable to take a plurality of angular positions with respect to the apparatus, includes storing a plurality of sets of reference information in association with the positions of the sensor, respectively, determining which one of the angular positions which the sensor is currently taking, displaying on the display a direction as to which one of bodily parts is to be used in accordance with the current angular position of the sensor to urge a user to input biometric data of the one of the bodily parts by the sensor, and carrying out authentication of the user by comparing the inputted biometric data with one of the sets of reference information corresponding to the current angular position of the sensor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A and 3B are diagrams which illustrate an example of an operating state storage unit;

FIGS. 4A and 4B are diagrams which illustrate an example of a recommended registration pattern storage unit;

FIGS. 5A and 5B are diagrams which illustrates an example of a recommended registration policy storage unit;

FIG. 6 is a diagram which illustrates an example of a fingerprint data storage unit;

FIG. 7 is a diagram which illustrates an example of an authentication log;

FIG. 8 is a diagram which illustrates an example of a registration screen displayed under the control of a display control unit;

FIGS. 10A and 10B are flowcharts which illustrate a data update processing procedure performed by a recommended information managing unit;

FIGS. 11A to 11D are flowcharts which illustrate an authentication processing procedure performed by the information processing apparatus according to the embodiment 2;

FIG. 13 is a diagram which illustrates an example of a recommended registration policy storage unit;

FIG. 14 is a diagram which illustrates an example of a recommended registration policy storage unit;

DESCRIPTION OF EMBODIMENTS

Detailed description will be made below with reference to the drawings regarding embodiments of the authentication method, the authentication program, and the information processing apparatus disclosed in the present specification. It can be noted that such embodiments are by no means intended to restrict the authentication method, the authentication program, and the information processing apparatus disclosed in the present specification.

First Embodiment

Figure 1:
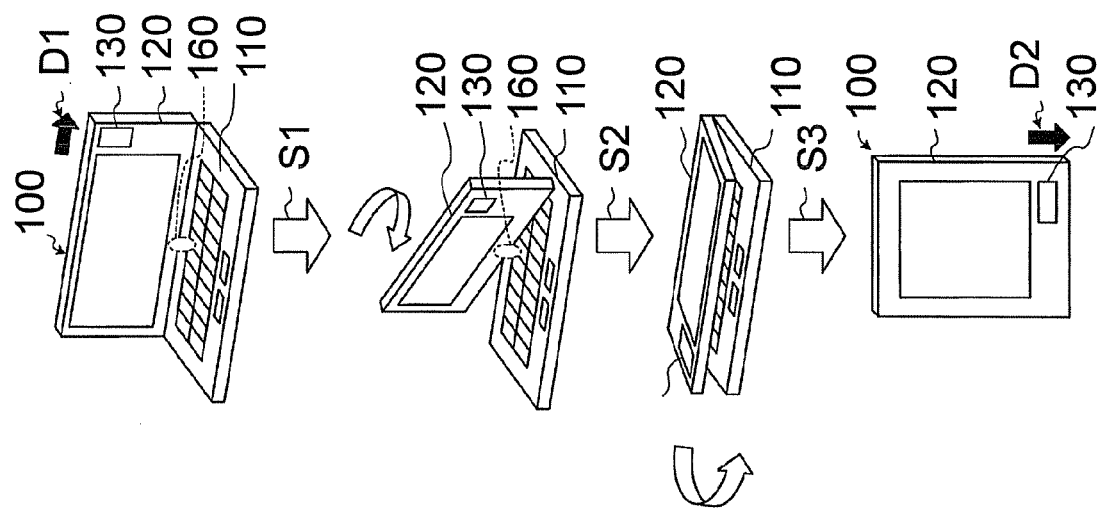
FIG. 1 is a diagram for describing, in outline, an information processing apparatus according to an embodiment 1.

First, an outline description will be made regarding an information processing apparatus 100 according to an embodiment 1. FIG. 1 is a diagram for describing, in outline, the information processing apparatus 100 according to the embodiment 1. It can be noted that, in the embodiment 1, the information processing apparatus 100 is a laptop personal computer having a function of allowing the display such as a liquid crystal display to be turned and to be folded up.

As illustrated in the top view in FIG. 1, the information processing apparatus 100 includes an input unit 110 such as a keyboard, a mouse, etc., a fingerprint sensor 130, and a hinge 160.

The fingerprint sensor 130 is mounted on a frame of the display unit 120, and acquires a fingerprint image of the user's finger. Specifically, as illustrated in the top view in FIG. 1, when the fingerprint is input along the direction D1, the fingerprint sensor 130 receives the fingerprint image. That is to say, when the user inputs the user's fingerprint to the information processing apparatus 100, the user presses his/her finger into contact with the fingerprint sensor 130, and moves his/her finger thus pressed into contact therewith along the direction D1.

The hinge 160 allows the user to turn the display unit 120 and to tilt the display unit 120 along the front-back direction when the user manually moves the display unit 120. In such an example illustrated in FIG. 1, the information processing apparatus 100 is folded such that the display unit 120 overlaps the input unit 110 (Step S2) after the display unit 120 is turned by 180 degrees by the user (Step S1). Then, the information processing apparatus 100 is operated by the user in the state in which the fingerprint sensor 130 is positioned on the lower side (Step S3). In this case, as illustrated in the bottom view in FIG. 1, the fingerprint sensor 130 receives a fingerprint image when the fingerprint is input along the direction D2.

In a case in which the information processing apparatus 100 is in the state illustrated in the top view in FIG. 1, in general, the kind of finger which the user can easily press into contact with the fingerprint sensor 130 is thought to be the thumb of the right hand. On the other hand, in a case in which the information processing apparatus 100 is in the state illustrated in the bottom view in FIG. 1, in general, the kind of finger which the user can easily press into contact with the fingerprint sensor 130 is thought to be the second finger of the right hand. That is to say, the kind of finger which the user can easily press into contact with the fingerprint sensor 130 differs depending upon the state in which the information processing apparatus 100 is operated.

With such an arrangement, the information processing apparatus 100 according to the embodiment 1 stores the kinds of fingers which the user can easily press into contact with the fingerprint sensor 130 in increments of states in which the information processing apparatus 100 is operated. The information thus stored is set beforehand by the manufacturer (the developer of the information processing apparatus 100 or the like). When fingerprint data is registered, the information processing apparatus 100 determines the kind of finger which can be easily input by the user according to the state in which the information processing apparatus 100 is operated. Then, the information processing apparatus 100 prompts the user to register the fingerprint data for the user's finger thus determined to be the finger which can be easily input. Thus, the information processing apparatus 100 allows the user to register fingerprint data which can be easily input, thereby storing high quality fingerprint data. It can be noted that the state in which the information processing apparatus 100 is operated by the user will be referred to as the "operating state" hereafter.

With such an arrangement, the information processing apparatus 100 stores fingerprint data for each operating state. That is to say, for example, the information processing apparatus 100 is capable of storing fingerprint data for all ten fingers in the operating state A. At the same time, the information processing apparatus 100 is capable of storing fingerprint data for all ten fingers in the operating state B. Furthermore, in a case in which fingerprint data has been registered with respect to multiple kinds of the user's fingers for the same operating state, the information processing apparatus 100 allows the user to select the finger to be used for authentication. For example, in a case in which fingerprint data for five of the user's fingers has been registered for the operating state A, the information processing apparatus 100 allows the user to register beforehand which finger is to be used for authentication. It can be noted that, in general, in many cases, the information processing apparatus 100 allows fingerprint data for two or more fingers to be registered. The reason is that authentication cannot been performed based upon only the data for a single finger in a case in which that single finger has been injured. The apparatus has a display and a sensor for obtaining biometric data of a user, the sensor being movable to take a plurality of angular positions with respect to the apparatus.

Description will be made regarding the aforementioned outline with reference to an example illustrated in FIG. 1. For example, in a case in which the information processing apparatus 100 has received an instruction from the user to register fingerprint data in a case in which the operating state is that illustrated in the top view in FIG. 1, the information processing apparatus 100 performs a control operation so as to display a registration screen on the display unit 120, which allows the user to select the kind of finger which is used to register fingerprint data. In this stage, the information processing apparatus 100 performs the control operation so as to display character strings, symbols, etc., on the registration screen thus displayed, which indicate that the fingerprint data for the thumb of the right hand can be most easily input. Thus, the information processing apparatus 100 is capable of prompting the user to register the fingerprint data for the thumb of the right hand.

Moreover, in a case in which the information processing apparatus 100 has received an instruction from the user to register fingerprint data in a case in which the operating state is that illustrated in the bottom view in FIG. 1, the information processing apparatus 100 performs the control operation so as to display character strings, symbols, etc., on the registration screen, which indicate that the fingerprint data for the second finger of the right hand can be most easily input. Thus, the information processing apparatus 100 is capable of prompting the user to register the fingerprint data for the second finger of the right hand.

Then, the information processing apparatus 100 displays an authentication screen on the display unit 120 when it is started up or when a predetermined application is started up. Subsequently, the information processing apparatus 100 receives fingerprint data from the user via the fingerprint sensor 130. Subsequently, the information processing apparatus 100 verifies the fingerprint data (which will be referred to as the "reference fingerprint data" hereafter) thus received against the fingerprint data registered beforehand (which will be referred to as the "registered fingerprint data" hereafter).

In this step, the information processing apparatus 100 selects, from among the multiple registered fingerprint data thus stored, the registered fingerprint data which satisfies the following two conditions. The first condition is satisfied in a case in which the kind of finger which was used to input the registered fingerprint data matches the kind of finger selected by the user as the finger to be used for authentication. The second condition is satisfied in a case in which the operating state of the information processing apparatus 100 when the registered fingerprint data was input matches the operating state of the information processing apparatus 100 when the reference fingerprint data was input. In such a way, the information processing apparatus 100 verifies the reference fingerprint data against the registered fingerprint data thus selected.

It can be noted that, in a case in which the information processing apparatus 100 stores no registered fingerprint data that satisfies the aforementioned two conditions, the information processing apparatus 100 verifies the reference fingerprint data against different registered fingerprint data. Such verification processing will be described later.

As described above, the information processing apparatus 100 according to the embodiment 1 selects the kind of finger which can be easily used to input fingerprint data according to the operating state when the fingerprint data is registered, and prompts the user to register the fingerprint data for the kind of finger which can be easily input. Thus, the information processing apparatus 100 allows the user to perform registration for a finger which can be easily input, according to the operating state. As a result, the information processing apparatus 100 prevents registration of fingerprint data in a state in which there is a gap between the finger and the fingerprint sensor, or in a state in which the finger shakes. Thus, the information processing apparatus 100 holds high-quality fingerprint data, thereby enabling authentication processing to be performed with high precision.

Figure 2:
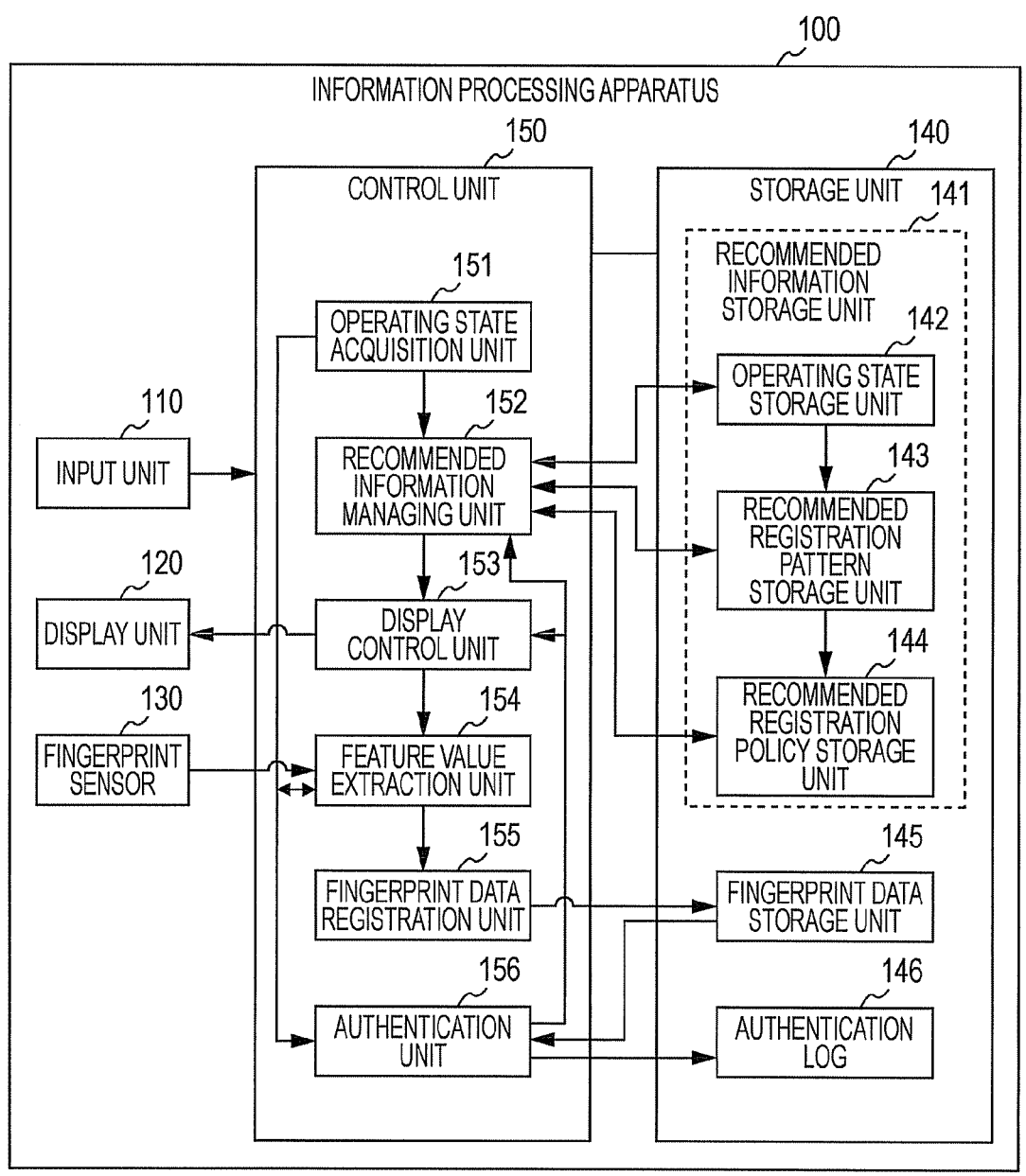
FIG. 2 is a diagram which illustrates the configuration of the information processing apparatus according to the embodiment 1.

Next, description will be made regarding the configuration of the information processing apparatus 100 according to the embodiment 1. FIG. 2 is a diagram which illustrates the configuration of the information processing apparatus 100 according to the embodiment 1. As illustrated in FIG. 2, the information processing apparatus 100 includes the input unit 110, the display unit 120, the fingerprint sensor 130, a storage unit 140, and a control unit 150. The storage stores a plurality of sets of reference information in association with the positions of the sensors, respectively. The controller determines which one of the angular positions the sensor is currently taking, displays on the display a direction as to which one of bodily parts is to be used in accordance with the current angular position of the sensor to urge a user to input biometric data of the one of the bodily parts by the sensor, and carries out authentication of the user by comparing the inputted biometric data with one of the sets of reference information corresponding to the current angular position of the sensor.

The input unit 110 is an input device for inputting various kinds of information and various kinds of instructions, and is a keyboard or mouse, for example. The input unit 110 allows the user to perform an operation for registering fingerprint data and to input the user ID. The display unit 120 is a display device which displays various kinds of information, and is a liquid crystal display, for example. Such a display unit 120 displays a registration screen which allows the user to select the kind of finger used for the registration of fingerprint data, a selection screen which allows the user to select the finger used for authentication, etc. The fingerprint sensor 130 is a device which acquires a fingerprint image of the finger of the user.

The storage unit 140 is a storage device which stores various kinds of information, and includes a recommended information storage unit 141, a fingerprint data storage unit 145, and an authentication log 146. The recommended information storage unit 141 includes an operating state storage unit 142, a recommended registration pattern storage unit 143, and a recommended registration policy storage unit 144.

The operating state storage unit 142 stores the operating states which the information processing apparatus 100 can adopt. FIGS. 3A and 3B illustrate examples of the operating state storage unit 142. As illustrated in FIGS. 3A and 3B, the operating state storage unit 142 stores items such as the operating state number, the turn angle, and the screen orientation.

The term "operating state number" represents an identification number which allows the operating state to be identified. The term "turn angle" represents the angle by which the display unit 120 has been turned. For example, with the turn angle of the information processing apparatus 100 illustrated in the top view in FIG. 1 as 0 degrees, the turn angle of the information processing apparatus 100 illustrated in the bottom view in FIG. 1 is 180 degrees.

The term "screen orientation" represents the orientation of the display unit 120 when it is operated by the user. For example, with the screen orientation of the information processing apparatus 100 illustrated in the top view in FIG. 1 as "horizontal", the screen orientation of the information processing apparatus 100 illustrated in the bottom view in FIG. 1 is "vertical". It can be noted that the screen orientation is determined based upon the resolution of the display unit 120. For example, with the resolution of the display unit 120 as "640×480", in a case in which the horizontal resolution of the display unit 120 is "640", the screen orientation is defined as "horizontal". In this case, in a case in which the vertical resolution of the display unit 120 is "640", the screen orientation is defined as "vertical".

It can be noted that, in the present specification, the operating state of the information processing apparatus 100 illustrated in the top view in FIG. 1 is defined as the standard operating state. Specifically, the standard operating state is defined as the state in which the turn angle of the information processing apparatus 100 is "0" degrees, and the screen orientation is "horizontal". With such a state as the standard operating state, in the state of the information processing apparatus 100 illustrated in the bottom view in FIG. 1, the turn angle is 180 degrees, and the screen orientation is "vertical".

That is to say, in the first row in the operating state storage unit 142 illustrated in FIG. 3A, the turn angle is set to "0" degrees and the screen orientation is set to "horizontal", and accordingly, it indicates the operating state of the information processing apparatus 100 illustrated in the top view in FIG. 1. Furthermore, in the second row in the operating state storage unit 142 illustrated in FIG. 3A, the turn angle is set to "180" degrees and the screen orientation is set to "vertical", and accordingly, it indicates the operating state of the information processing apparatus 100 illustrated in the bottom view in FIG. 1. Moreover, in the third row in the operating state storage unit 142 illustrated in FIG. 3A, the turn angle is set to "180" degrees and the screen orientation is set to "horizontal", and accordingly, it indicates the state in which the information processing apparatus 100 illustrated in the bottom view in FIG. 1 is operated in a state in which the fingerprint sensor 130 is positioned on the upper-right side.

The recommended registration pattern storage unit 143 stores combinations of the kind of finger and the priority level of the registration patterns recommended to the user. It can be noted that the information processing apparatus 100 includes a recommended registration pattern storage unit 143 for each pattern of the combination of the kind of finger and the priority level. That is to say, in some cases, the information processing apparatus 100 includes multiple recommended registration pattern storage units 143.

FIGS. 4A and 4B illustrate an example of the recommended registration pattern storage unit 143. As illustrated in FIGS. 4A and 4B, the recommended registration pattern storage unit 143 stores items such as the pattern number, the kind of finger, and the priority level.

The term "pattern number" represents an identification number which enables identification of the pattern of the combination of the kind of finger and the priority level. The term "the kind of finger" represents each kind of finger for all ten fingers of both hands. The term "priority level" represents the fingerprint data registration recommendation level. It can be noted that, in the present specification, the level of recommendation becomes higher as the value of the priority level becomes smaller.

That is to say, the recommended registration pattern storage unit 143 illustrated in FIG. 4A specifies registration recommendation levels in descending order from "thumb of right hand", to "second finger of right hand", "middle finger of right hand", . . . , "little finger of left hand". Additionally, the recommended registration pattern storage unit 143 illustrated in FIG. 4A specifies that the first-highest registration recommendation level is set for "second finger of right hand" and "second finger of left hand". Furthermore, the second-highest registration recommendation level is set for "second finger of right hand" and "second finger of left hand". Moreover, the fifth-highest registration recommendation level is set for "little finger of right hand" and "little finger of left hand".

The recommended registration policy storage unit 144 stores the pattern numbers of the recommended registration pattern storage units 143 in increments of the operating states. FIGS. 5A and 5B illustrate an example of the recommended registration policy storage unit 144. As illustrated in FIGS. 5A and 5B, the recommended registration policy storage unit 144 stores items such as the operating state number and the recommended registration pattern.

The term "operating state number" corresponds to the operating state number stored in the operating state storage unit 142 illustrated in FIGS. 3A and 3B. The term "recommended registration pattern" corresponds to the pattern number stored in the recommended registration pattern storage unit 143 illustrated in FIGS. 4A and 4B.

That is to say, in the first row in the recommended registration policy storage unit 144 illustrated in FIG. 5A, the operating state number is set to "001", which indicates the state in which the turn angle is set to "0" degrees, and the screen orientation is set to "horizontal". Specifically, the first row in the recommended registration policy storage unit 144 illustrated in FIG. 5A specifies that, in this operating state (operating state number "001"), the kind of finger which is to be used for registration is recommended in the priority ranking order stored in the recommended registration pattern storage unit 143 having the pattern number "1" (see FIG. 4A).

The fingerprint data storage unit 145 stores the fingerprint data registered beforehand by the user. FIG. 6 illustrates an example of the fingerprint data storage unit 145. As illustrated in FIG. 6, the fingerprint data storage unit 145 stores items such as the user ID, the operating state number, the kind of finger, the registration quality, the fingerprint data, and the update time and date.

The term "user ID" represents the identification number which enables identification of the user who has registered his/her fingerprint data. The term "operating state number" represents the operating state of the information processing apparatus 100 when the fingerprint data was registered, and corresponds to the operating state number stored in the operating state storage unit 142 illustrated in FIGS. 3A and 3B. The term "kind of finger" represents the kind of finger used to register the fingerprint data. The term "registration quality" represents the quality of the fingerprint data. For example, the registration quality is a value calculated based upon the degree of block distortion or the cumulative edge value of the fingerprint image acquired by the fingerprint sensor 130. The term "fingerprint data" represents the image of the user's fingerprint or the features of the fingerprint image. The term "update time and date" represents the time and date (year, month, day, hour, minute, and second) at which the fingerprint data was registered or updated.

That is to say, the first row in the fingerprint data storage unit 145 illustrated in FIG. 6 specifies that the fingerprint data for the second finger of the right hand was registered by the user with the user ID "UserA" in the operating state in which the turn angle was set to "0" degrees, and the screen orientation was set to "horizontal".

The authentication log 146 stores information with respect to authentication results. FIG. 7 illustrates an example of the authentication log 146. As illustrated in FIG. 7, the authentication log 146 has items such as the time and date, the user ID, the operating state number, the kind of finger, the verification score, and the verification results.

The term "time and date" represents the time and date (year, month, day, hour, minute, and second) at which the authentication processing was performed. The term "user ID" represents the user ID of the user who was subjected to the authentication processing, and corresponds to the user ID stored in the fingerprint data storage unit 145 illustrated in FIG. 6. The term "operating state number" represents the operating state of the information processing apparatus 100 when the authentication processing was performed, and corresponds to the operating state number stored in the operating state storage unit 142 illustrated in FIGS. 3A and 3B. The term "kind of finger" represents the kind of finger used in the authentication processing. The term "verification score" represents the degree of similarity between the reference fingerprint data and the registered fingerprint data. The term "verification results" represents the result of whether the authentication result was a success or a failure. In a case in which the verification score is equal to or greater than a predetermined threshold value, "success" is stored as the verification result, and in a case in which the verification score is smaller than the predetermined threshold value, "failure" is stored as the verification result.

That is to say, the first row in the authentication log 146 illustrated in FIG. 7 specifies that, in an operating state in which the turn angle was set to "0" degrees, and the screen orientation was set to "horizontal", a user with the user ID "UserA" performed the authentication operation using the second finger of the user's right hand, and the authentication result was a success.

The control unit 150 controls various kinds of processing with respect to the authentication processing performed by the information processing apparatus 100, and includes an operating state acquisition unit 151, a recommended information managing unit 152, a display control unit 153, a feature value extraction unit 154, a fingerprint registration unit 155, and an authentication unit 156.

The operating state acquisition unit 151 acquires the operating state of the information processing apparatus 100. Specifically, in a case in which the user has performed an operation so as to register or update the fingerprint data, or in a case in which the information processing apparatus 100 has performed the authentication processing for the user, the operating state acquisition unit 151 acquires the information with respect to the turn angle of the display unit 120 and the orientation of the display unit 120. For example, the operating state acquisition unit 151 detects the turn angle of the display unit 120 from the hinge 160. Furthermore, the operating state acquisition unit 151 detects the orientation of the display unit 120 by acquiring the resolution of the screen using a program such as the Win32 API (Application Programming Interface), the Microsoft NET Framework API, or the like, implemented in Windows (trademark).

The recommended information managing unit 152 acquires various kinds of information from the recommended information storage unit 141, and updates such various kinds of information stored in the recommended information storage unit 141. Specifically, in a case in which the user has performed an operation so as to register or update the fingerprint data, the recommended information managing unit 152 acquires the operating state number that corresponds to the turn angle of the display unit 120 and the orientation of the display unit 120 acquired by the operating state acquisition unit 151, from the operating state storage unit 142. Subsequently, the recommended information managing unit 152 acquires the recommended registration pattern which is stored in the recommended registration policy storage unit 144 in a form associated with the operating state number thus acquired. Then, the recommended information managing unit 152 identifies the recommended registration pattern storage unit 143 which stores the recommended registration pattern in a form associated with the pattern number thus acquired, and outputs various kinds of information stored in the recommended registration pattern storage unit 143 thus identified to the display control unit 153.

For example, let us consider a case in which a case in which the operating state storage unit 142 is in the state illustrated in FIG. 3A, the recommended registration pattern storage units 143 are in the states illustrated in FIGS. 4A and 4B, and the recommended registration policy storage unit 144 is in the state illustrated in FIG. 5A. Furthermore, with the turn angle acquired by the operating state acquisition unit 151 as "0" degrees, and the orientation of the display unit 120 as "horizontal", in this case, the recommended information managing unit 152 acquires, from the operating state storage unit 142, the operating state number "001" which is stored in a form associated with the turn angle "0" and the screen orientation "horizontal". Subsequently, the recommended information managing unit 152 acquires, from the recommended registration policy storage unit 144, the recommended registration pattern "1" which is stored in a form associated with the operating state number "001". Then, the recommended information managing unit 152 identifies the recommended registration pattern storage unit 143 which stores the pattern number "1" (see FIG. 4A) as the recommended registration pattern.

Furthermore, in a case in which the operating state number that corresponds to the turn angle of the display unit 120 and the orientation of the display unit 120, which are acquired by the operating state acquisition unit 151, is not stored in the operating state storage unit 142, the recommended information managing unit 152 updates various kinds of information stored in the recommended information storage unit 141. Specifically, the recommended information managing unit 152 instructs the operating state storage unit 142 to store the turn angle of the display unit 120 and the orientation of the display unit 120 thus acquired by the operating state acquisition unit 151. In this step, the recommended information managing unit 152 stores, as an operating state number, a number which differs from the numbers which have already been assigned as the operating state numbers. For example, the recommended information managing unit 152 stores a number obtained by adding 1 to the current maximum operating state number that had already been used.

Subsequently, the recommended information managing unit 152 selects the operating state most similar to the operating state thus added, from among the operating states stored in the operating state storage unit 142. Here, description will be made regarding the state specified by the phrase "similar to the operating state". In the present specification, an "operating state similar to the operating state A" represents an operating state in which the screen orientation is set to the same orientation as that in the operating state A, and there is a small difference in the turn angle from the operating state A. Furthermore, in a case in which there is no operating state in which the screen orientation is set to the same orientation as that of the operating state A, a "state similar to the operating state A" represents an operating state in which there is a small difference in the turn angle from the operating state A. Furthermore, in a case in which there are multiple operating states in which there is the same difference in the turn angle from the operating state A, the operating state represented by the smallest operating state number is selected from among the aforementioned multiple operating states, as the "operating state similar to the operating state A".

Subsequently, the recommended information managing unit 152 acquires, from the recommended registration policy storage unit 144, the recommended registration pattern that corresponds to the operating state number which exhibits the best similarity to the operating state thus added. Then, the recommended information managing unit 152 stores, in the recommended registration policy storage unit 144, a combination of the operating state number thus additionally stored in the operating state storage unit 142 and the pattern number of the recommended registration pattern thus acquired.

For example, as illustrated in the aforementioned example, let us consider a case in which the operating state storage unit 142 is in the state illustrated in FIG. 3A, the recommended registration pattern storage units 143 are in the states illustrated in FIGS. 4A and 4B, and the recommended registration policy storage unit 144 is in the state illustrated in FIG. 5A. Furthermore, with the turn angle acquired by the operating state acquisition unit 151 as "90" degrees, and the orientation of the display unit 120 as "horizontal", in this case, as in the record indicated by the hatched region in FIG. 3B, the recommended information managing unit 152 instructs the operating state storage unit 142 to store a combination of the turn angle "90" degrees and the screen orientation "horizontal". In this step, as illustrated in FIG. 3B, the recommended information managing unit 152 stores "004" as the operating state number, which differs from the operating state numbers that have already been assigned.

Subsequently, the recommended information managing unit 152 identifies "001" as the operating state number which exhibits the best similarity to the operating state represented by the operating state number "004". Specific description will be made regarding such identification processing. First, the recommended information managing unit 152 identifies the operating state numbers "001" and "003" in which the screen orientation is set to the same orientation as that in the operating state number "004", i.e., "horizontal". Subsequently, the recommended information managing unit 152 selects the operating state number which exhibits the smallest difference in the turn angle from the turn angle "90" degrees in the operating state number "004". In this case, the difference in the turn angle between the operating state numbers "004" and "001" is "90" degrees. Moreover, the difference in the turn angle between the operating state numbers "004" and "003" is also "90" degrees. Accordingly, the recommended information managing unit 152 selects "001", which is the smallest operating state number, as the operating state number which represents the operating state that exhibits the best similarity to the operating state represented by the operating state number "004".

Subsequently, the recommended information managing unit 152 acquires, from the recommended registration policy storage unit 144, the recommended registration pattern "1" which is stored in a form associated with the operating state number "001" thus identified as described above. Subsequently, as indicated by the hatched region illustrated in FIG. 5B, the recommended information managing unit 152 instructs the recommended registration policy storage unit 144 to store a combination of the operating state number "004" and the recommended registration pattern "1".

The display control unit 153 controls the display unit 120 so as to display various kinds of information. Specifically, in a case in which the user has performed an operation so as to register or update the fingerprint data, the display control unit 153 displays a registration screen on the display unit 120, which allows the user to select the kind of finger which is used to perform the registration operation or the update operation. In this stage, the display control unit 153 displays the kinds of fingers and priority levels input from the recommended information managing unit 152 in a mutually associated manner. FIG. 8 is a diagram which illustrates an example of the registration screen thus displayed under the control of the display control unit 153. In the example illustrated in FIG. 8, the display control unit 153 performs the display control operation assuming that the combinations of the kind of finger and priority level are input from the recommended information managing unit 152 as illustrated in FIG. 3A.

As illustrated in FIG. 8, the display control unit 153 performs the display control operation for the registration screen displaying the kinds of fingers and the priority level with which the registration operation is to be recommended. The registration screen illustrated in FIG. 8 recommends to the user the kind of finger to be used for the registration operation in priority ranking order from "thumb of right hand", to "second finger of right hand", "middle finger of right hand", . . . , "little finger of left hand". The user selects the finger to be used for the fingerprint data registration via such a registration screen. Then, the user presses the finger thus selected into contact with the fingerprint sensor 130, and moves the finger thus selected on the fingerprint sensor 130, thereby registering the fingerprint data in the information processing apparatus 100.

It can be noted that the display control unit 153 does not need to display the information with respect to all the kinds of fingers on the registration screen. Specifically, the display control unit 153 does not need to display the kinds of fingers which exhibit priority levels which are equal to or lower than a predetermined priority level. For example, the display control unit 153 does not need to display, on the registration screen, the information with respect to the five fingers of the left hand, which have priority levels equal to or lower than 6. This allows the information processing apparatus 100 to prevent registration of fingerprint data for fingers when is predicted that it would result in poor quality registered fingerprint data. As a result, the information processing apparatus 100 holds only high-quality fingerprint data, thereby providing high-precision authentication processing.

Furthermore, in a case in which fingerprint data has been registered for multiple kinds of fingers in the same operating state, the display control unit 153 performs a display control operation for a selection screen which allows the user to select the finger to be used in the authentication operation. The information processing apparatus 100 holds the information with respect to the kinds of fingers thus selected via the selection screen thus displayed, in increments of operating states.

Furthermore, when the authentication processing is performed for the user, the display control unit 153 controls the display unit 120 so as to display an authentication screen. The authentication screen thus displayed is a screen which allows the user to input a user ID.

The feature value extraction unit 154 extracts the feature values of a fingerprint image. Specifically, in a case in which the user has performed an operation so as to register or update the fingerprint data, the feature extraction unit 154 corrects the fingerprint image acquired by the fingerprint sensor 130, and calculates the feature values of the fingerprint image thus corrected. Then, the feature value extraction unit 154 outputs the feature values thus calculated to the fingerprint data registration unit 155. In this step, the feature value extraction unit 154 outputs, to the fingerprint data registration unit 155, the operating state number which represents the operating state in the registration step, which is identified by the operating state acquisition unit 151, and the registration quality such as the degree of block distortion in the fingerprint image, the cumulative edge value for the fingerprint image, etc.

Furthermore, when the authentication processing is performed for the user, the feature value extraction unit 154 corrects the fingerprint image acquired by the fingerprint sensor 130, and calculates the feature values of the fingerprint image thus corrected, in the same way as described above. Then, the feature value extraction unit 154 outputs, to the authentication unit 156, the feature values of the fingerprint image thus calculated as the reference fingerprint data.

It can be noted that description will be made regarding an example in which the feature values extracted from the fingerprint image are used as the fingerprint data. Also, the fingerprint data may be the fingerprint image itself. In this case, the feature value extraction unit 154 corrects the fingerprint data acquired by the fingerprint sensor 130, and does not extract the feature values from the fingerprint image. The feature value extraction unit 154 outputs the fingerprint image thus corrected to the fingerprint data registration unit 155 or the authentication unit 156.

The fingerprint registration unit 155 registers, in the fingerprint data storage unit 145, the fingerprint data thus input from the feature value extraction unit 154. Specifically, the fingerprint data registration unit 155 instructs the fingerprint data storage unit 145 to store, as the fingerprint data, the feature values of the fingerprint image thus input from the feature value extraction unit 154. In this step, the fingerprint data registration unit 155 instructs the fingerprint data storage unit 145 to store the user ID input by the user in the registration operation, the operating state number which represents the operating state when the registration was performed, the kind of finger selected by the user via the registration screen, the registration quality of the fingerprint image calculated by the feature value extraction unit 154, and the date and time at which the registration was performed.

The authentication unit 156 performs the authentication processing by verifying the reference fingerprint data against the registered fingerprint data. Specifically, in a case in which the reference fingerprint data has been input from the feature value extraction unit 154, the authentication unit 156 selects the registered fingerprint data to be used to verify the reference fingerprint data, from among the multiple fingerprint data stored in the fingerprint data storage unit 145, and verifies the reference fingerprint data against the registered fingerprint data thus selected. Specific description will be made below regarding the registered fingerprint data selection processing performed by the authentication unit 156.

First, the authentication unit 156 narrows down the multiple records stored in the fingerprint data storage unit 145 into records that have the same user ID as that input via the authentication screen. Subsequently, the authentication unit 156 further narrows down the records thus narrowed down into records for which the kind of finger matches that selected via the selection screen.

Furthermore, in a case in which there are multiple records thus narrowed down, the authentication unit 156 selects the record for which the operating state number which represents the operating state matches that which has been acquired by the operating state acquisition unit 151 in the authentication operation. It can be noted that the operating state acquired by the operating state acquisition unit 151 in the authentication operation will be referred to as the "current operating state" hereafter. Also, the operating state number which represents the current operating state will be referred to as the "current operating state number" hereafter.

In a case in which the fingerprint data storage unit 145 does not store the current operating state number, the authentication unit 156 further narrows down the multiple records thus narrowed down to the record with the operating state that is most similar to the current operating state.

The authentication unit 156 uses the fingerprint data stored in the record thus narrowed down as the registered fingerprint data. Then, the authentication unit 156 verifies the reference fingerprint data against the registered fingerprint data thus obtained. In a case in which the degree of similarity therebetween is equal to or greater than a predetermined threshold value, the authentication unit 156 judges that the user's identity has been confirmed. On the other hand, in a case in which the degree of similarity therebetween is smaller than the predetermined threshold, the authentication unit 156 selects the record for which the operating state is second-most similar to the current operating state, from among the records thus narrowed down based upon the user ID and the kind of finger, and verifies the reference fingerprint data against the registered fingerprint data stored in the record thus selected.

In the same way, until the verification succeeds, the authentication unit 156 selects the registered fingerprint data in order of similarity between the registered operating state and the current operating state, and verifies the reference fingerprint data against the registered fingerprint data thus selected. Then, in a case in which verification of the reference fingerprint data does not succeed with respect to all the fingerprint data stored in the records thus narrowed down based upon the user ID and the kind of finger, the authentication unit 156 verifies the reference fingerprint data against the registered fingerprint data for different kinds of fingers. In a case in which the verification does not succeed for all the different kinds of fingers, the authentication unit 156 judges that the user's identity has not been confirmed. Then, after the completion of the authentication processing, the authentication unit 156 instructs the authentication log 146 to store various kinds of information.

It can be noted that, in a case in which the fingerprint data storage unit 145 does not store the current operating state number, the authentication unit 156 instructs the recommended information managing unit 152 to update various kinds of information stored in the recommended information storage unit 141. Upon receiving such an instruction, the recommended information managing unit 152 updates various kinds of information stored in the recommended information storage unit 141 in the same way as in the update processing in the fingerprint data registration operation. Specifically, the recommended information managing unit 152 instructs the operating state storage unit 142 to store the current operating state (the turn angle of the display unit 120 and the orientation of the display unit 120). In this step, the recommended information managing unit 152 instructs the operating state storage unit 142 to store, as the recommended state number, a number that differs from the operating state numbers which have been already assigned.

Subsequently, the recommended information managing unit 152 selects, from the operating state storage unit 142, the operating state which is most similar to the current operating state. Subsequently, the recommended information managing unit 152 acquires the recommended registration pattern that corresponds to the operating state number thus identified as described above. Then, the recommended information managing unit 152 instructs the recommended registration policy storage unit 144 to store a combination of the operating state number thus additionally stored in the operating state storage unit 142 and the pattern number of the recommended registration pattern thus acquired.

Figure 9:
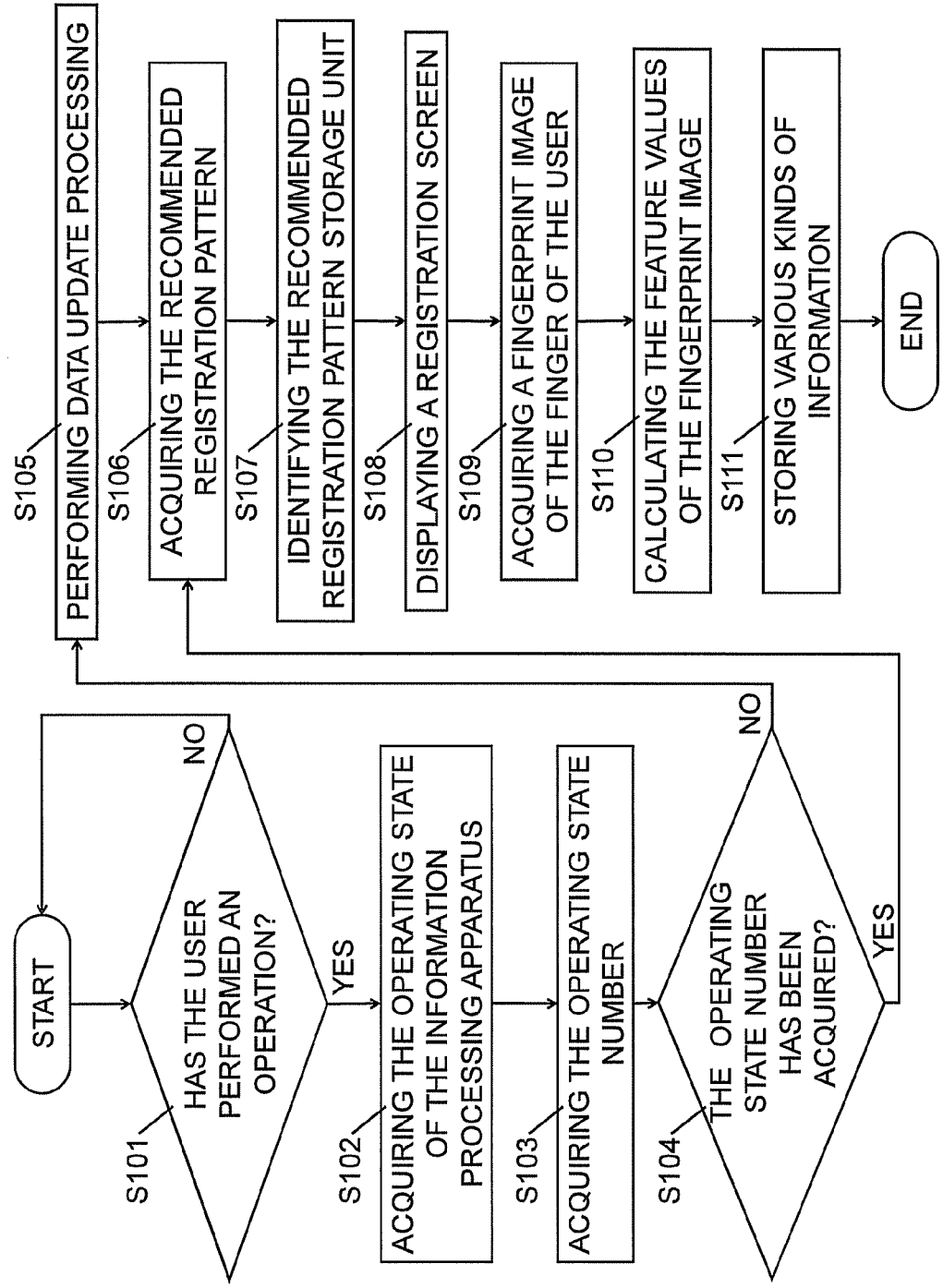
FIG. 9 is a flowchart which illustrates a fingerprint data registration procedure performed by the information processing apparatus according to the embodiment 1.
Figure 11C:
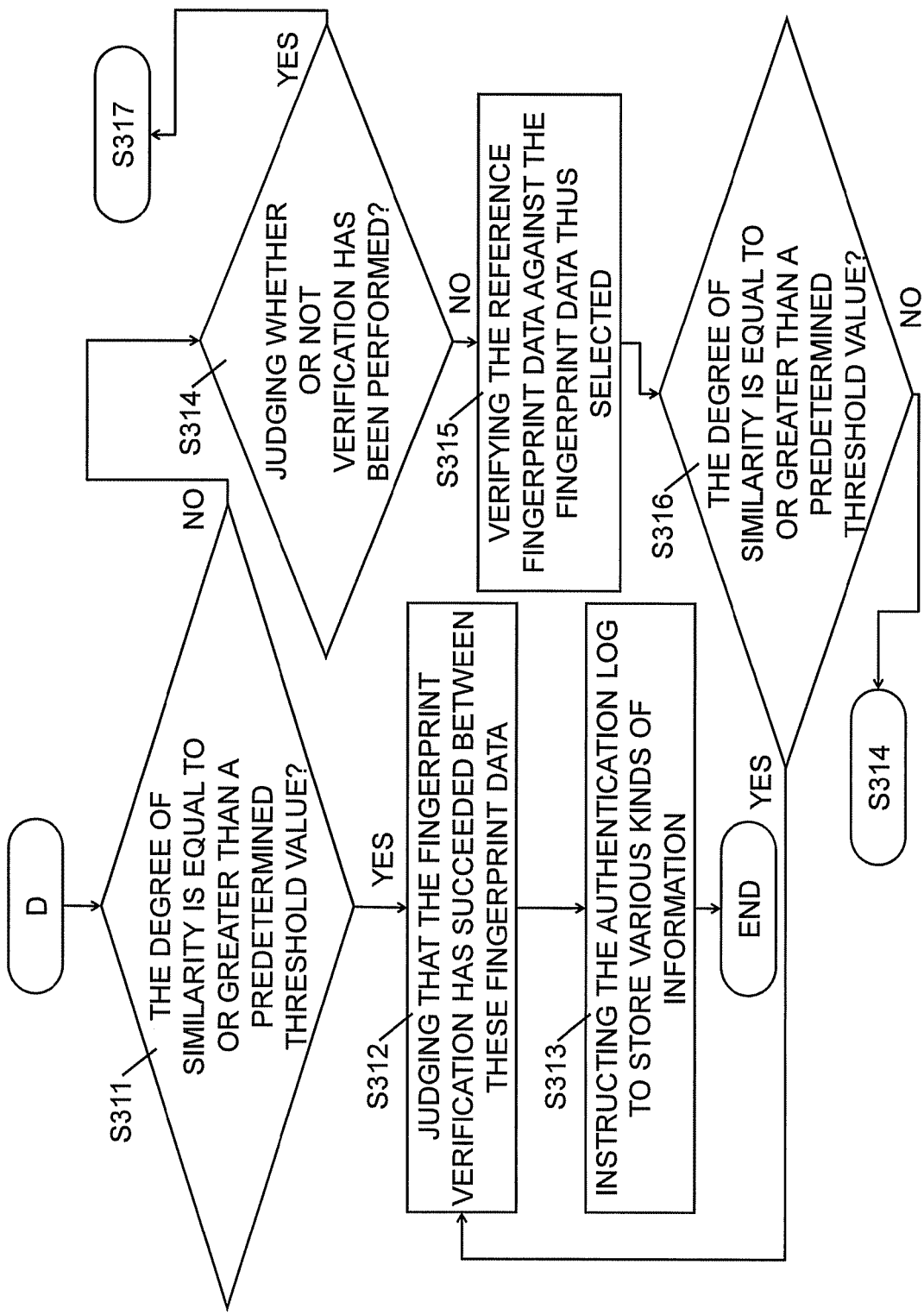

Next, description will be made regarding the procedure for the fingerprint data registration processing performed by the information processing unit 100 according to the embodiment 1. FIG. 9 is a flowchart which illustrates the fingerprint data registration processing procedure performed by the information processing apparatus 100 according to the embodiment 1. As illustrated in FIG. 9, in a case in which the user has performed an operation so as to register or update the fingerprint data (in a case of "YES" in Step S101), the operating state acquisition unit 151 included in the information processing apparatus 100 acquires the operating state of the information processing apparatus 100 (Step S102).

Subsequently, the recommended information managing unit 152 acquires, from the operating state storage unit 142, the operating state number that corresponds to the turn angle of the display unit 120 and the orientation of the display unit 120 acquired by the operating state acquisition unit 151 (Step S103). In a case in which the operating state number has not been acquired from the operating state storage unit 142 (in a case of "NO" in Step S104), the recommended information managing unit 152 performs data update processing for updating various kinds of information stored in the recommended information storage unit 141 (Step S105). It can be noted that description will be made later with reference to FIGS. 10A and 10B, regarding the procedure for the data update processing performed by the recommended information managing unit 152.

On the other hand, in a case in which the operating state number has been acquired from the operating state storage unit 142 (in a case of "YES" in Step S104), the recommended information managing unit 152 acquires the recommended registration pattern stored in the recommended registration policy storage unit 144 in a form associated with the operating state number thus acquired (Step S106). Furthermore, in a case in which the operating state number has not been acquired from the operating state storage unit 142 (in a case of "NO" in Step S104), the recommended information managing unit 152 acquires, from the recommended registration policy storage unit 144, the recommended registration pattern that corresponds to the operating state number thus additionally stored in the operating state storage unit 142 (Step S106). Then, the recommended information managing unit 152 identifies the recommended registration pattern storage unit 143 storing the recommended registration pattern thus acquired in a form associated with the pattern number (Step S107).

Subsequently, the display control unit 153 controls the display unit 120 to display a registration screen which displays the kinds of fingers and the priority levels thereof stored in the recommended registration pattern storage unit 143 thus identified in the aforementioned Step S107 (Step S108). Subsequently, the user selects the kind of finger via the registration screen thus displayed, and the fingerprint sensor 130 acquires a fingerprint image of the finger of the user (Step s109).

Subsequently, the feature value extraction unit 154 corrects the fingerprint image thus acquired by the fingerprint sensor 130, and calculates the feature values of the fingerprint image thus corrected (Step S110). Subsequently, the fingerprint data registration unit 155 instructs the fingerprint data storage unit 145 to store various kinds of information such as the feature values of the fingerprint image thus calculated by the feature value extraction unit 154, the operating state number, etc. (Step S111).

Next, description will be made regarding the procedure for the data update processing performed by the recommended information managing unit 152 illustrated in FIG. 2. FIGS. 10A and 10B are flowcharts which illustrate the data update processing procedure performed by the recommended information managing unit 152 illustrated in FIG. 2. As illustrated in FIGS. 10A and 10B, when the data update processing is performed, the recommended information managing unit 152 instructs the operating state storage unit 142 to store the turn angle of the display unit 120 and the orientation of the display unit 120 acquired by the operating state acquisition unit 151 in the fingerprint data registration operation and the operating state number used anew (Step S201).

Subsequently, the recommended information managing unit 152 selects the operating state which is most similar to the operating state represented by the operating state number thus added (which will be referred to as "additional operating state" hereafter) from among the operating states stored in the operating state storage unit 142. Specifically, in a case in which the operating state storage unit 142 stores a record with the screen orientation matching the additional operating state (in a case of "YES" in Step S202), the recommended information managing unit 152 narrows down the records into the records with the screen orientation matching the additional operating state (Step S203).

Subsequently, the recommended information managing unit 152 calculates the difference between each of the turn angles stored in the records thus narrowed down and the turn angle employed in the additional operating state. In a case in which there are multiple records thus narrowed down which exhibit the smallest difference in the turn angle (in a case of "YES" in Step S204), the recommended information managing unit 152 selects, as the operating state most similar to the additional operating state, the operating state represented by the smallest operating state number from among the aforementioned multiple records (Step S205). On the other hand, in a case in which there are not multiple records which exhibit the difference in the turn angle (in a case of "NO" in Step S204), the recommended information managing unit 152 selects, as the operating state most similar to the additional operating state, the operating state which exhibits the smallest difference in the turn angle (Step S206).

Furthermore, in a case in which there is no record with the screen orientation matching the additional operating state (in a case of "NO" in Step S202), the recommended information managing unit 152 calculates the difference between the turn angle of each of the records stored in the operating state storage unit 142 and the turn angle employed in the additional operating state. In a case in which there are multiple records which exhibit the smallest difference in the turn angle (in a case of "YES" in Step S207), the recommended information managing unit 152 selects, as the operating state most similar to the additional operating state, the operating state represented by the smallest operating state number (Step S208). On the other hand, in a case in which there are not multiple records which exhibit the smallest difference in the turn angle (in a case of "NO" in Step S207), the recommended information managing unit 152 selects, as the operating state most similar to the additional operating state, the operating state stored in the record which exhibits the smallest difference in the turn angle (Step S209).

Subsequently, the recommended information managing unit 152 acquires, from the recommended registration policy storage unit 144, the recommended registration pattern that corresponds to the operating state number thus identified (Step S210). Then, the recommended information managing unit 152 instructs the recommended registration policy storage unit 144 to store a combination of the operating state number thus additionally stored in the operating state storage unit 142 and the pattern number of the recommended registration pattern thus acquired (Step S211).

Next, description will be made regarding the procedure for the authentication processing performed by the information processing apparatus 100 according to the embodiment 1. FIGS. 11A to 11D are flowcharts which illustrate the authentication processing procedure performed by the information processing apparatus 100 according to the embodiment 1. As illustrated in FIGS. 11A to 11D, when the information processing apparatus 100 is started up, or when a predetermined application implemented in the information processing apparatus 100 is started up (in a case of "YES" in Step S301), the display control unit 153 controls the display unit 120 to display an authentication screen (Step S302).

The user inputs the user ID via the authentication screen, and presses his/her finger thus selected into contact with the fingerprint sensor 130. In this stage, the fingerprint sensor 130 acquires a fingerprint image of the finger pressed into contact therewith by the user. Subsequently, the feature value extraction unit 154 corrects the fingerprint image acquired by the fingerprint sensor 130, and calculates the feature values of the fingerprint image thus corrected (Step S303).

Subsequently, the authentication unit 156 narrows down the multiple records stored in the fingerprint data storage unit 145 into the records with the user ID matching that input by the user (Step S304). Subsequently, the authentication unit 156 further narrows down the records thus narrowed down into the records with the kind of finger matching that selected via the selection screen (Step S305).

In a case in which there are multiple records thus narrowed down (in a case of "YES" in Step S306), the operating state acquisition unit 151 acquires the operating state (current operating state) of the information processing apparatus 100 (Step S307). It can be noted that, such a state in which there are multiple records thus narrowed down in Step S305 means that the fingerprint data storage unit 145 stores multiple fingerprint data for different operating states.

In a case in which, of the records thus narrowed down in Step S305, there is a record with the operating state number matching the current operating state number (in a case of "YES" in Step S308), the authentication unit 156 verifies the reference fingerprint data calculated by the feature value extraction unit 154 against the fingerprint data stored in the record matching the current operating state number (Step S309). On the other hand, in a case in which there is no record matching the current operating state number (in a case of "NO" in Step S308), the authentication unit 156 selects the fingerprint data stored in the record with the operating state most similar to the current operating state from among the records thus narrowed down in Step S305, and verifies the reference fingerprint data against the fingerprint data thus selected (Step S310).

It can be noted that, in a case in which the fingerprint data storage unit 145 stores no record, the authentication unit 156 instructs the recommended information managing unit 152 to update various kinds of information stored in the recommended information storage unit 141. The data update processing thus performed by the recommended information managing unit 152 is the same as that illustrated in FIGS. 10A and 10B.

Then, in a case in which the degree of similarity between the registered fingerprint data and the reference fingerprint data is equal to or greater than a predetermined threshold value (in a case of "YES" in Step S311), the authentication unit 156 judges that the fingerprint verification has succeeded between these fingerprint data (Step S312). In this stage, the user identity is confirmed. Furthermore, the authentication unit 156 instructs the authentication log 146 to store various kinds of information (Step S313).

On the other hand, in a case in which the degree of similarity therebetween is smaller than the predetermined threshold value (in a case of "NO" in Step S311), the authentication unit 156 judges whether or not verification has been performed for the reference fingerprint data against all the fingerprint data stored in the records thus narrowed down in Step S305 (Step S314). In a case in which the verification has not been performed against all the fingerprint data (in a case of "NO" in Step S314), the authentication unit 156 selects the fingerprint data stored in the record with the operating state which is second most similar to the current operating state from among the records thus narrowed down in Step S305, and verifies the reference fingerprint data against the fingerprint data thus selected (Step S315).

Then, in a case in which the degree of similarity between the registered fingerprint data and the reference fingerprint data is equal to or greater than a predetermined threshold value (in a case of "YES" in Step S316), the authentication unit 156 judges that the verification has succeeded between the fingerprint data (Step S312), and instructs the authentication log 146 to store various kinds of information (Step S313). On the other hand, in a case in which the degree of similarity therebetween is smaller than the predetermined threshold value (in a case of "NO" in Step S316), the authentication unit 156 selects the record from among the records thus narrowed down in Step S305 in order of similarity to the current operating state until verification is performed for the reference fingerprint data against all the fingerprint data stored in the records thus narrowed down in Step S305, thereby verifying the reference fingerprint data against the fingerprint data stored in the records thus narrowed down (Step S315).

On the other hand, in a case in which verification has been performed for the reference fingerprint data against all the fingerprint data stored in the records thus narrowed down in Step S305 (in a case of "YES" in Step S314), the authentication unit 156 judges whether or not the verification has been completed for the fingerprint data for all kinds of fingers stored in the records thus narrowed down based upon the user ID (Step S317). In a case in which the verification has been completed for all kinds of fingers (in a case of "YES" in Step S317), the authentication unit 156 judges that the verification has failed (Step S318). Furthermore, the authentication unit 156 instructs the authentication log 146 to store various kinds of information (Step S313).

On the other hand, in a case in which the verification has not been completed for all kinds of fingers (in a case of "NO" in Step S317), the authentication unit 156 determines that verification is to be performed against the registered fingerprint data of the fingers of other different kinds (Step S319), and the flow returns to the registration procedure in the aforementioned Step S306.

Furthermore, in a case in which there are not multiple records thus narrowed down in Step S305 (in a case of "NO" in Step S306), the authentication unit 156 verifies the reference fingerprint data against the fingerprint data registered in such a record (Step S320). Then, in a case in which the degree of similarity between the registered fingerprint data and the reference fingerprint data is equal to or greater than a predetermined threshold value (in a case of "YES" in Step S321), the authentication 156 judges that the verification has succeeded between the fingerprint data (Step S322), and instructs the authentication log 146 to store various kinds of information (Step S313).

On the other hand, in a case in which the degree of similarity therebetween is smaller than the predetermined threshold value (in a case of "NO" in Step S321), the authentication unit 156 performs processing for judging whether or not the verification has been completed with respect to all kinds of fingers (Step S317). The following processing procedure is the same as that described above.

As described above, when the user registers the fingerprint data, the information processing apparatus 100 according to the embodiment 1 acquires the operating state of the information processing apparatus 100 in the registration operation, and prompts the user to register the fingerprint data of the finger which the user can easily input, according to the operating state thus acquired. Such an arrangement allows the information processing apparatus 100 to register the fingerprint data of the finger which the user can easily input. Thus, the information processing apparatus 100 holds high-quality fingerprint data, thereby providing high-precision authentication processing using the high-quality fingerprint data.

Furthermore, when the information processing apparatus 100 performs the authentication processing for the user, the information processing apparatus 100 acquires the operating state of the information processing apparatus 100, and performs authentication processing using the fingerprint data registered in the operating state which is identical or similar to the operating state thus acquired. This allows the information processing apparatus 100 to perform high-precision authentication processing using the optimum registered fingerprint data.

It can be noted that description has been made in the aforementioned embodiment 1 regarding an arrangement in which the priority levels (degrees of recommendation) of the fingers used for registration is displayed when the fingerprint data is registered. Also, the information processing apparatus 100 may display the priority levels of the kinds of fingers used for the registration before the fingerprint authentication is performed. Specifically, when the authentication processing is performed for the user, the information processing apparatus 100 displays, as an authentication screen, the screen displaying the kinds of fingers and the priority levels in a mutually associated manner as illustrated in FIG. 8. Thus, such an arrangement also allows the information processing apparatus 100 to acquire a high-quality fingerprint image from the user in the authentication step, thereby providing high-precision authentication processing.

Also, the information processing apparatus 100 may display, on the authentication screen, only the kinds of fingers registered in the fingerprint data storage unit 145. Thus, such an arrangement allows the information processing apparatus 100 to prevent the authentication from being performed using the fingers which have not been registered.

Second Embodiment

Description has been made in the aforementioned embodiment 1 regarding an arrangement in which the kinds of fingers used for registration and the degrees of recommendation of the kinds of fingers used for the registration are displayed on the display unit 120 based upon the priority ranking order stored beforehand in the recommended information storage unit 141. Here, the information processing apparatus may automatically update the priority ranking order stored in the recommended information storage unit 141. Specifically, the information processing apparatus may automatically update the priority ranking order stored in the recommended registration policy storage unit 144 based upon the registration quality stored in the fingerprint data storage unit 145. Accordingly, description will be made in the embodiment 2 regarding an information processing apparatus 200 which automatically updates the priority ranking order stored in the recommended registration policy storage unit 144.

Figure 12:
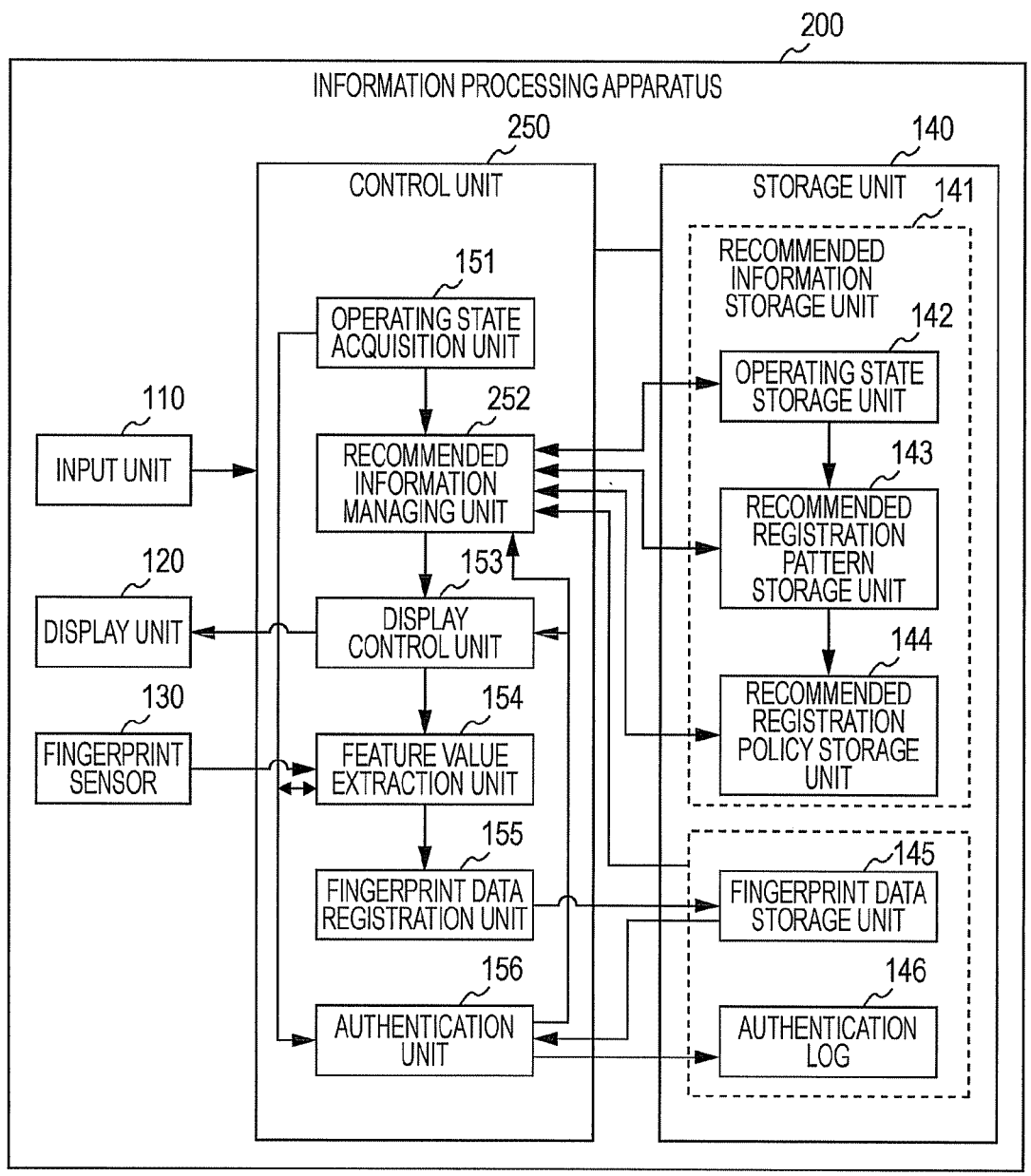
FIG. 12 is a diagram which illustrates the configuration of an information processing apparatus according to an embodiment 2.

First, description will be made regarding the configuration of the information processing apparatus 200 according to the embodiment 2. FIG. 12 is a diagram which illustrates the configuration of the information processing apparatus 200 according to the embodiment 2. It can be noted that the components having the same functions as those illustrated in FIG. 2 are denoted by the same reference numerals, and detailed description thereof will be omitted. As illustrated in FIG. 12, the information processing apparatus 200 includes a recommended information managing unit 252 instead of the recommended information managing unit 152, as compared with the information processing apparatus 100 illustrated in FIG. 2.

The recommended information managing unit 252 acquires various kinds of information from the recommended information storage unit 141 in the same way as with the recommended information managing unit 152 illustrated in FIG. 2. Furthermore, the recommended information managing unit 252 according to the embodiment 2 periodically updates the priority ranking order stored in the recommended information storage unit 141 based upon the registration quality stored in the fingerprint data storage unit 145.

Specifically, the recommended information managing unit 252 acquires the combinations of the "kind of finger" and "registration quality" stored in the fingerprint data storage unit 145 in increments of the operating state numbers. Subsequently, the recommended information managing unit 252 acquires various kinds of information stored in the recommended registration policy storage unit 144. Then, the recommended information managing unit 252 judges whether or not the priority ranking order stored in the recommended registration pattern storage unit 143 in increments of the operating state numbers matches the descending order of the "registration quality".

In a case in which the priority ranking order does not match the descending order of the "registration quality", the recommended information managing unit 252 generates a recommended registration unit 143 anew which stores a different pattern number, and updates the recommended registration pattern stored in the recommended registration policy storage unit 144.

Description will be made regarding the priority ranking order update processing performed by the recommended information managing unit 252 with reference to an example illustrated in FIG. 13 and FIG. 14. FIG. 13 is a diagram which illustrates an example of the recommended registration pattern storage unit 143, and FIG. 14 is a diagram which illustrates an example of the recommended registration policy storage unit 144. Here, let us consider a case in which the recommended registration pattern storage unit 143 is in the state illustrated in FIGS. 4A and 4B, the recommended registration policy storage unit 144 is in the state illustrated in FIG. 5A, and the fingerprint data storage unit 145 is in the state illustrated in FIG. 6.

In this case, the recommended information managing unit 252 acquires the combinations of the kind of finger and the registration quality that correspond to the operating state number "001", i.e., "second finger of right hand, 80 points", "thumb of right hand, 90 points", and "middle finger of right hand, 70 points" from the fingerprint data storage unit 145. Subsequently, the recommended information managing unit 252 acquires, from the recommended registration policy storage unit 144, the recommended registration pattern "1" that corresponds to the operating state number "001". Subsequently, the recommended information managing unit 252 acquires the priority levels of the second finger of the right hand, the thumb of the right hand, and the middle finger of the right hand, i.e., "2", "1", and "3", from the recommended registration pattern storage unit 143 (see FIG. 4A) which stores the pattern number "1".

In this case, the priority ranking order thus acquired matches the descending order of the registration quality acquired from the fingerprint data storage unit 145. Accordingly, the recommended information managing unit 252 does not perform the priority ranking order update processing for the operating state number "001". For the same reason, the recommended information managing unit 252 does not perform the priority ranking order update processing for the operating state number "001".

Subsequently, the recommended information managing unit 252 acquires the combinations of the "kind of finger" and the "registration quality" that correspond to the operating state number "003", i.e., "the second finger of the right hand, 80 points" and "the thumb of the right hand, 90 points", from the recommended registration policy storage unit 144. Subsequently, the recommended information managing unit 252 acquires, from the recommended registration policy storage unit 144, the recommended registration pattern "2" that corresponds to the operating state number "003". Subsequently, the recommended information managing unit 252 acquires the priority levels of the second finger of the right hand and the thumb of the right hand, i.e., "1" and "4", from the recommended registration pattern storage unit 143 (see FIG. 4B) which stores the pattern number "2".

That is to say, the priority level of the second finger of the right hand is "1", and the priority level of the thumb of the right hand is "4". Accordingly, the priority level of the second finger of the right hand is higher than the priority level of the thumb of the right hand. However, the registration quality of the second finger of the right hand is "80 points", and the registration quality of the thumb of the right hand is "90 points". Accordingly, the registration quality of the thumb of the right hand is higher than the registration quality of the second finger of the right hand.

In this case, first, the recommended information managing unit 252 duplicates the recommended registration pattern storage unit 143 storing the pattern number "2" (see FIG. 4B), and generates a recommended registration pattern storage unit 143 as illustrated in FIG. 13. Specifically, the recommended information managing unit 252 updates the pattern number stored in the recommended registration pattern storage unit 143 thus duplicated so as to change the pattern number to a number which differs from the pattern numbers that have already been assigned. In the example illustrated in FIG. 13, the recommended information managing unit 252 updates the pattern number by adding 1 to the current maximum number of the pattern numbers which have already been assigned. Furthermore, as indicated by the hatched region illustrated in FIG. 13, the recommended information managing unit 252 exchanges the priority level of the thumb of the right hand and the priority level of the second finger of the right hand.

Then, as indicated by the hatched region illustrated in FIG. 14, the recommended information managing unit 252 updates the recommended registration pattern stored in the recommended registration policy storage unit 144 in a form associated with the operating state number "003" so as to change the recommended registration pattern from "2" to "3". As described above, the recommended information managing unit 252 duplicates and updates the recommended registration pattern storage unit 143 so as to provide the priority ranking order matching the descending order of the registration quality.

It can be noted that description has been made regarding an arrangement in which the recommended information managing unit 252 periodically performs the priority ranking order update processing. Also, the recommended information managing unit 252 may perform the priority ranking order update processing every time a record is additionally stored in the fingerprint data storage unit 145. Such an arrangement allows the recommended information managing unit 252 to maintain the priority ranking order stored in the recommended registration pattern storage unit 143 in a state matching the descending order of the registration quality in a sure manner.

Figure 15:
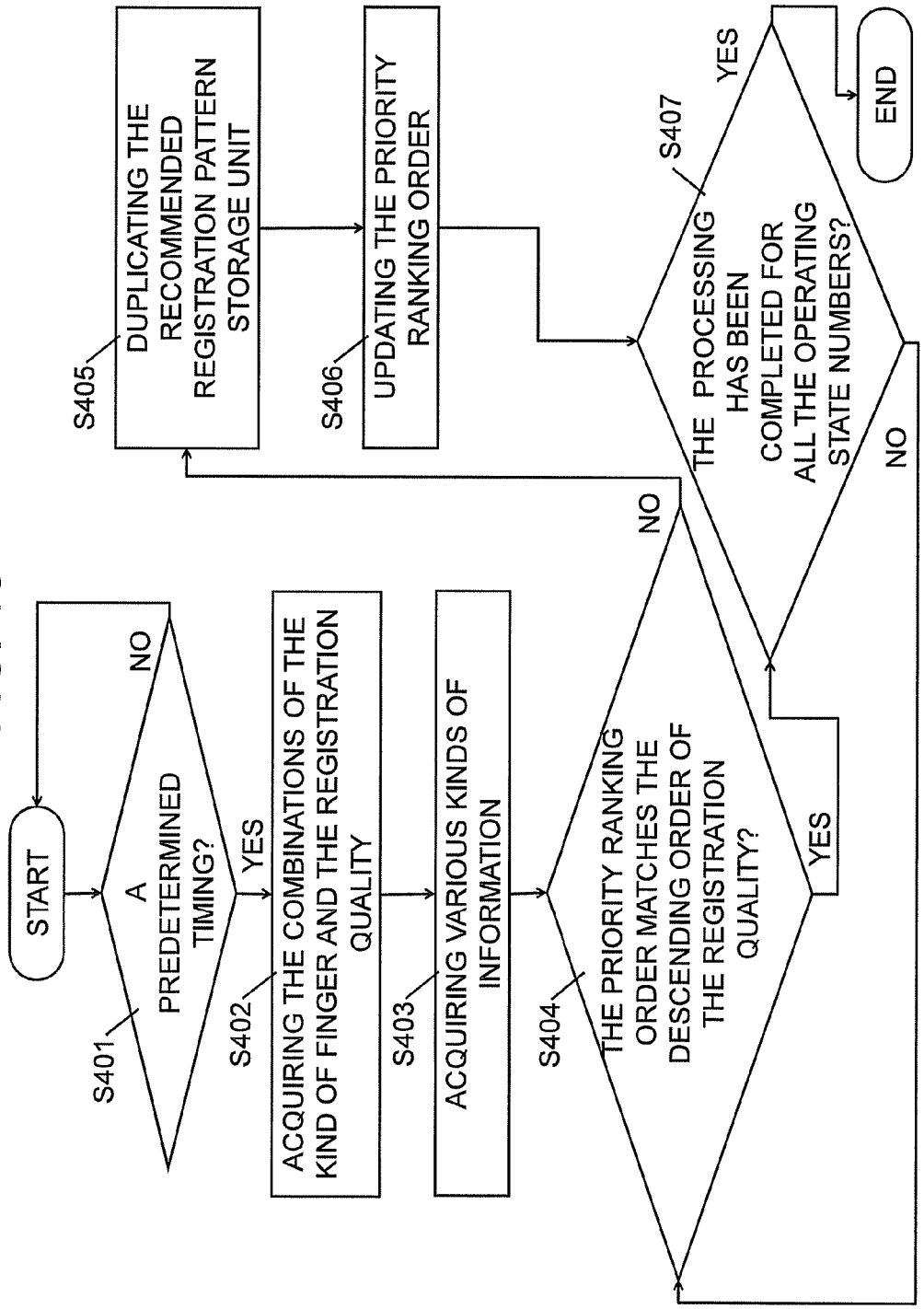
FIG. 15 is a flowchart which illustrates a priority ranking order update processing procedure performed by the information processing apparatus according to the embodiment 2.

Next, description will be made regarding the procedure for the priority ranking order update processing performed by the information processing apparatus 200 according to the embodiment 2. FIG. 15 is a flowchart which illustrates the priority ranking order update processing procedure performed by the information processing apparatus 200 according to the embodiment 2. As illustrated in FIG. 15, at a predetermined timing (in a case of "YES" in Step S401), the recommended information managing unit 252 acquires the combinations of the "kind of finger" and the "registration quality" stored in the fingerprint data storage unit 145 in increments of the operating state numbers (Step S402).

Subsequently, the recommended information managing unit 252 acquires various kinds of information stored in the recommended registration policy storage unit 144 (Step S403). Subsequently, the recommended information managing unit 252 sets a predetermined operating state number for the processing-target operating state number, and judges whether or not the priority ranking order stored in the recommended registration pattern storage unit 143 that corresponds to the processing-target operating state number thus set matches the descending order of the "registration quality" (Step S404).

In a case in which the priority ranking order stored in the recommended registration pattern storage unit 143 does not match the descending order of the "registration quality" (in a case of "NO" in Step S404), the recommended information managing unit 252 acquires the recommended registration pattern stored in the recommended registration policy storage unit 144 in a form associated with the processing-target operating state number. Then, the recommended information managing unit 252 duplicates the recommended registration pattern storage unit 143 indicated by the pattern number thus acquired, and changes the pattern number of the recommended registration pattern storage unit 143 thus duplicated to a different number (Step S405).

Subsequently, the recommended information managing unit 252 updates the priority ranking order stored in the recommended registration pattern storage unit 143 thus duplicated such that it matches the descending order of the registration quality acquired from the fingerprint data storage unit 145 (Step S406).

The recommended information managing unit 252 performs the processing procedure illustrated in the aforementioned Steps S404 through S406 for all the operating state numbers stored in the fingerprint data storage unit 145. In a case in which the processing has been completed for all the operating state numbers (in a case of "YES" in Step S407), the recommended information managing unit 252 ends the processing.

As described above, the information processing apparatus 200 according to the embodiment 2 automatically updates the priority ranking order assigned in increments of the kinds of fingers in descending order of the registration quality of the fingerprint image, thereby suggesting each user to use the finger of the kind which the user can easily input. For example, in some cases, there is a difference in the kind of finger which the user can easily input the fingerprint data between the users even if the same operating state is employed. Accordingly, in some cases there is a difference in the quality of the fingerprint image between the users even if the same operating state is employed. With the information processing apparatus 200 according to the embodiment 2, the priority ranking order is automatically updated based upon the registration quality, thereby allowing the user to register the fingerprint data with respect to the finger of the kind suitable for himself/herself.

It can be noted that description has been made in the aforementioned embodiment 2 regarding an arrangement in which the priority ranking order is automatically updated based upon the registration quality. Also, the information processing apparatus 200 may automatically update the priority ranking order based upon the verification score or the verification results stored in the authentication log 146. Specifically, the information processing apparatus 200 may update the priority ranking order in descending order of the verification score stored in the authentication log 146. Also, the information processing apparatus 200 may update the priority ranking order in descending order of the success rate based upon the verification results stored in the authentication log 146. In such a case, in the same way as in the priority ranking order update processing illustrated in FIG. 15, after the information processing apparatus 200 duplicates the recommended registration pattern storage unit 143, the information processing apparatus 200 updates the priority ranking order stored in the recommended registration pattern storage unit 143 thus duplicated, and updates the recommended registration pattern stored in the recommended registration policy storage unit 144.

Also, description has been made in the aforementioned embodiments 1 and 2 regarding an arrangement which employs one-to-one authentication in which authentication is performed after the user is identified. Also, the information processing apparatus 100 or 200 may be applied to one-to-N authentication in which authentication is performed without receiving the input of the user ID. With such an arrangement, when the fingerprint data is registered, the information processing apparatus 100 instructs the user to register his/her fingerprint data after the user inputs the user ID, in the same way as in the above-described embodiment 1. On the other hand, when the authentication is performed for the user, the information processing apparatus 100 receives the fingerprint image without a request to input the user ID. Then, the information processing apparatus 100 narrows down the records stored in the fingerprint data storage unit 145 into the records matching the finger of the kind selected via the selection screen. Furthermore, in a case in which there are multiple records thus narrowed down, the information processing apparatus 100 selects the record matching the current operating state number acquires by the operating state acquisition unit 151 in the authentication step. Here, in a case in which the fingerprint data storage unit 145 does not store the current operating state number, the information processing apparatus 100 further narrows down the multiple records thus narrowed down into the records most similar to the operating state acquired in the authentication step. The information processing apparatus 100 verifies the reference fingerprint data against the fingerprint data stored in the record thus narrowed down. With such an arrangement, the records are not narrowed down based upon the user ID, and accordingly, there can be multiple records thus narrowed down. Accordingly, of the registered fingerprint data stored in the records thus narrowed down, in a case in which there are multiple registered fingerprint data with the similarity to the reference fingerprint data being equal to or greater than a threshold value, the information processing apparatus 100 selects the registered fingerprint data with the highest similarity, and performs verification processing using the registered fingerprint data thus identified.

Also, in the above-described embodiments 1 and 2, the information processing apparatuses 100 and 200 may operate as an authentication server. Specifically, upon receiving a fingerprint data registration request from a client terminal, the information processing apparatus 100 performs the fingerprint data registration processing. Furthermore, upon receiving an authentication request, the information processing apparatus 100 performs the authentication processing.

More specific description will be made regarding such an arrangement. In the information processing apparatus 100, each of the operating state storage unit 142, the fingerprint data storage unit 145, and the authentication log 146 holds an item "terminal information" for identifying the client terminal. With such an arrangement, upon receiving a fingerprint data registration request including the fingerprint data, the terminal information, etc., from the client terminal, the information processing apparatus 100 registers the fingerprint data, the terminal information, etc., in the fingerprint data storage unit 145. Furthermore, upon receiving an authentication request including the fingerprint data, the user ID, the terminal information, etc., from the client terminal, the information processing apparatus 100 performs authentication processing after narrowing down the fingerprint data stored in the fingerprint data storage unit 145 based upon the user ID, the terminal information, etc., thus received.

Also, description has been made in the aforementioned embodiments 1 and 2 regarding an arrangement in which the recommended registration policy storage unit 144 handles common information for all the user IDs. Also, such information may be managed for each user ID. Specifically, the recommended registration policy storage unit 144 further provides an item "user ID". With such an arrangement, the recommended registration policy storage unit 144 stores the recommended registration pattern in a form associated with a combination of the operating state number and the user ID. Accordingly, such an arrangement enables a control operation to be performed such that, in a case in which the operating state number matches "001", for the user A, the information processing apparatus 100 displays a registration screen based upon the recommended registration pattern storage unit 143 that corresponds to the pattern number "1". Furthermore, for the user B, the information processing apparatus 100 displays a registration screen based upon the recommended registration pattern storage unit 143 that corresponds to the pattern number "2".

Also, description has been made in the aforementioned embodiments 1 and 2 with reference to an arrangement which performs fingerprint authentication. Also, the information processing apparatuses 100 and 200 may be applied to authentication employing other biometric information that differs from the fingerprint. For example, the information processing apparatuses 100 and 200 may be applied to vein authentication in which the shape of veins in the user's finger is acquired.

Also, all or a part of the processing automatically performed as described in the above-described embodiments 1 and 2 may be performed manually. Also, all or a part of the processing manually performed as described in the above-described embodiments 1 and 2 may be performed automatically using a known method. In addition, the processing procedures described above or illustrated in the drawings (FIG. 9 to FIG. 11D, FIG. 15, etc.), specific terms, the information including various kinds of data or parameters may be modified as desired, except for particular cases.

Also, each component of each device illustrated in the drawings has been described as a function-conceptual component, and the present art is not restricted to such a physical configuration as illustrated in the drawings (e.g., FIG. 2, FIG. 12, etc.). That is to say, distribution/integration of each device is not restricted to those illustrated in the drawings. Also, all or a part of the configuration of each device may be functionally or physically distributed or integrated in increments of components as desired according to various kinds of loads or usage situations. Furthermore, all or a desired part of each processing function provided by each device is realized by a CPU (Central Processing Unit) and a program analyzed and executed by the CPU, or realized in the form of hardware employing a wired logic circuit.

Figure 16:
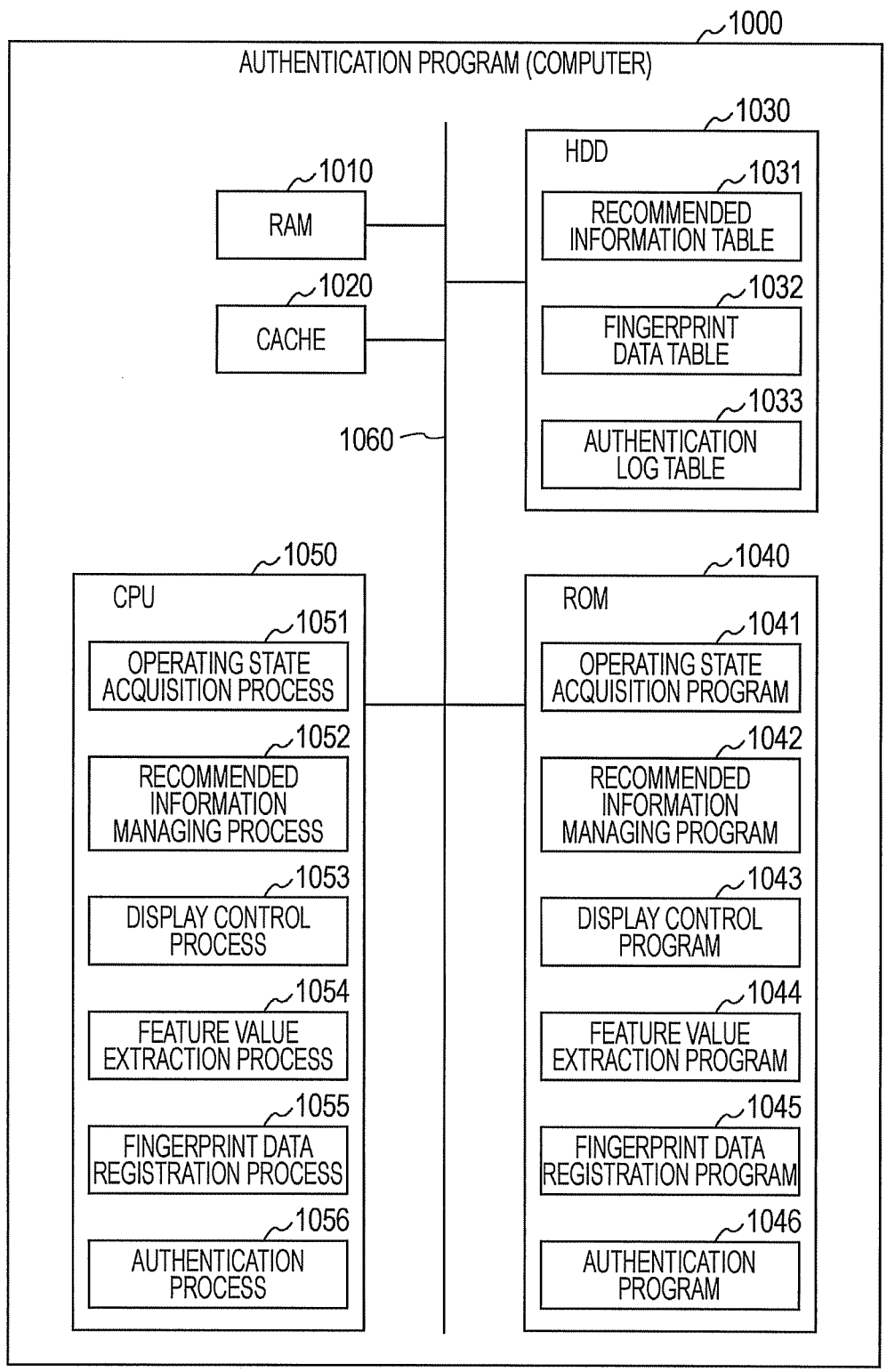
FIG. 16 is a diagram which illustrates a computer which executes an authentication program.

Also, various kinds of processing described in the aforementioned embodiments can be realized by a computer such as a personal computer, workstation, or the like, by executing a program prepared beforehand. Accordingly, description will be made below with reference to FIG. 16 regarding an example of a computer which executes an authentication program which provides the same functions as those in the above-described embodiments 1 and 2. FIG. 16 is a diagram which illustrates a computer 1000 which executes an authentication program.

As illustrated in FIG. 16, the authentication program (computer) 1000 has a configuration including RAM (Random Access Memory) 1010, cache 1020, a HDD (Hard Disk Drive) 1030, ROM (Read Only Memory) 1040, and a CPU 1050, connected to each other via a bus 1060. With such an arrangement, the ROM 1040 stores an authentication program which provides the same functions as those in the above-described embodiments 1 and 2, i.e., an operating state acquisition program 1041, a recommended information managing program 1042, a display control program 1043, a feature value extraction program 1044, a fingerprint data registration program 1045, and an authentication program 1046, as illustrated in FIG. 16.

With such an arrangement, the CPU 1050 reads out and executes these programs 1041 through 1046, thereby providing an operating state acquisition process 1051, a recommended information managing process 1052, a display control process 1053, a feature value extraction process 1054, a fingerprint data registration process 1055, and an authentication process 1056, according to the programs 1041 through 1046. It can be noted that the processes 1051 through 1056 correspond to the operating state acquisition unit 151, the recommended information managing unit 152, the display control unit 153, the feature value extraction unit 154, the fingerprint data registration unit 155, and the authentication unit 156, respectively.

Furthermore, as illustrated in FIG. 16, the HDD 1030 includes a recommended information table 1031, a fingerprint data table 1032, and an authentication log table 1033. It can be noted that the recommended information table 1031, the fingerprint data table 1032, and the authentication log table 1033 correspond to the recommended information storage unit 141, the fingerprint data storage unit 145, and the authentication log 146, respectively.

Also, the present art is not restricted to such an arrangement in which the aforementioned programs 1041 through 1046 are stored in the ROM 1040. Also, an arrangement may be made in which these programs are stored in a "movable physical medium" such as a flexible disk (FD), CD-ROM, MO disk, DVD disk, magnet-optical disk, IC card, or the like, a "fixed physical medium" such as a hard disk drive (HDD) provided in the form of an external or internal component of the computer 1000, or "other computers (or servers)" connected to the computer 1000 via a public line, the Internet, LAN (local Area Network), WAN (Wide Area Network), or the like, and the computer 1000 reads out the programs from such a medium or a computer and executes the programs thus read out.

The authentication method disclosed in the present specification offers the advantage of providing high-precision authentication processing.

As mentioned above, the present invention has been specifically described for better understanding of the embodiments thereof and the above description does not limit other aspects of the invention. Therefore, the present invention can be altered and modified in a variety of ways without departing from the gist and scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A method of controlling an apparatus having a display and a sensor for obtaining biometric data of a user, the sensor being movable to take a plurality of angular positions with respect to the apparatus, comprising:
    storing sets of reference information in association with the angular positions of the sensor, respectively, and fingerprint information indicating a registration quality of reference biometric data in association with at least one angular position;
    determining a current angular position of the sensor and at least one body part to contact the sensor based on the current angular position of the sensor corresponding with the stored fingerprint information and the stored reference information;
    outputting, based on the determining, an indication as to which body part corresponding with the stored reference information and the stored fingerprint information is to be used in accordance with the current angular position of the sensor; and
    carrying out an authentication process of the user by comparing the inputted biometric data with one of the sets of reference information corresponding to the current angular position of the sensor.

2. The method of claim 1, comprising storing a new set of reference information in association with a new angular position of the sensor when the new angular position of the sensor is stored.

3. An apparatus having a display and a sensor to obtain biometric data of a user, the sensor being movable to take a plurality of angular positions with respect to the apparatus, comprising:
    a storage to store sets of reference information in association with the positions of the sensor, respectively, and fingerprint information indicating a registration quality of reference biometric data in association with at least one angular position; and
    a controller to:
        determine a current angular position of the sensor and at least one body part to contact the sensor based on the current angular position of the sensor corresponding with the stored fingerprint information and the stored reference information, output, based on a determination of the current angular position of the sensor, an indication as to which body part corresponding with the stored reference information and the stored fingerprint information is to be used in accordance with the current angular position of the sensor, and carry out an authentication process of the user by comparing the inputted biometric data with one of the sets of reference information corresponding to the current angular position of the sensor.

4. The apparatus of claim 3, wherein the storage stores a new set of reference information in association with a new angular position of the sensor when the new angular position of the sensor is not stored.

5. A non-transitory computer readable recording medium storing a program to control an apparatus having a display and a sensor, the sensor being movable to take a plurality of angular positions with respect to the apparatus, the program causing the apparatus to execute a process comprising:

storing sets of reference information in association with the angular positions of the sensor, respectively, and fingerprint information indicating a registration quality of reference biometric data in association with at least one angular position;

determining a current angular position of the sensor and at least one body part to contact the sensor based on the current angular position of the sensor corresponding with the stored fingerprint information and the stored reference information;

outputting, based on the determining, an indication as to which body part corresponding with the stored reference information and the stored fingerprint information is to be used in accordance with the current angular position of the sensor; and carrying out an authentication process of the user by comparing the inputted biometric data with one of the sets of reference information corresponding to the current angular position of the sensor.

6. The non-transitory computer readable recording medium of claim 5, comprising storing a new set of reference information in association with a new angular position of the sensor when the new angular position of the sensor is not stored.

7. A method of controlling an apparatus having a display and a sensor for obtaining biometric data of a user, the sensor being movable to take a plurality of angular positions with respect to the apparatus, comprising:

storing sets of reference information in association with the angular positions of the sensor, respectively, and fingerprint information indicating a registration quality of reference biometric data in association with at least one angular position;

determining a current angular position of the sensor and at least one body part to contact the sensor based on the current angular position of the sensor corresponding with the stored fingerprint information and the stored reference information;

outputting, based on the determining, an indication as to which body part corresponding with the stored reference information and the stored fingerprint information is to be used in accordance with the current angular position of the sensor; and carrying out an authentication process of the user by comparing the inputted biometric data with one of the sets of reference information corresponding to the current angular position of the sensor.

8. The method of claim 1, wherein the determining determines a finger and hand combination corresponding with the current angular position, and the outputting indicates the finger and combination.

* * * * *

UNITED STATES PATENT AND TRADEMARK OFFICE
CERTIFICATE OF CORRECTION

PATENT NO. : 8,730,008 B2  Page 1 of 1
APPLICATION NO. : 12/561595
DATED : May 20, 2014
INVENTOR(S) : Takagi It is certified that error appears in the above-identified patent and that said Letters Patent is hereby corrected as shown below:

In the Claims

Column 26, Line 52, in Claim 2, delete "is" and insert -- is not --, therefor.

Signed and Sealed this
Nineteenth Day of August, 2014

Michelle K. Lee
*Deputy Director of the United States Patent and Trademark Office*